(12) United States Patent
Walker

(10) Patent No.: US 11,977,844 B1
(45) Date of Patent: May 7, 2024

(54) READING ASSISTANCE SPONSORSHIP SYSTEM AND METHODOLGY

(71) Applicant: Walker Reading Technologies, Inc., Rochester, MN (US)

(72) Inventor: Randall C. Walker, Rochester, MN (US)

(73) Assignee: Walker Reading Technologies, Inc., Rochester, MN (US)

( * ) Notice: Subject to any disclaimer, the term of this patent is extended or adjusted under 35 U.S.C. 154(b) by 343 days.

(21) Appl. No.: 17/169,146

(22) Filed: Feb. 5, 2021

Related U.S. Application Data

(60) Provisional application No. 62/970,251, filed on Feb. 5, 2020.

(51) Int. Cl.
| | |
|---|---|
| *G06F 40/30* | (2020.01) |
| *G06F 40/211* | (2020.01) |
| *G06F 40/284* | (2020.01) |
| *G06F 40/289* | (2020.01) |
| *G06F 40/40* | (2020.01) |

(52) U.S. Cl.
CPC ............ *G06F 40/30* (2020.01); *G06F 40/211* (2020.01); *G06F 40/284* (2020.01); *G06F 40/289* (2020.01); *G06F 40/40* (2020.01)

(58) Field of Classification Search
CPC ...... G06F 40/30; G06F 40/211; G06F 40/284; G06F 40/289; G06F 40/40
See application file for complete search history.

(56) References Cited

U.S. PATENT DOCUMENTS

| | | | |
|---|---|---|---|
| 7,861,163 B2 | 12/2010 | Walker | |
| 9,390,080 B2 | 7/2016 | Walker | |
| 9,760,910 B1* | 9/2017 | Tuchman | ............... G06Q 50/01 |
| 9,940,317 B2 | 4/2018 | Walker | |
| 10,489,496 B1* | 11/2019 | Sen | ..................... H04N 21/4122 |
| 10,515,138 B2 | 12/2019 | Walker | |
| 10,650,089 B1 | 5/2020 | Walker | |

(Continued)

OTHER PUBLICATIONS

Techcrunch, "Google Analytics Prepares for Life After Cookies", Frederic Lardinois, 3 pages, published May 13, 2021, accessed Jul. 4, 2021 at https://techcrunch.com/2021/05/13/google-analytics-prepares-for-life-after-cookies/.

*Primary Examiner* — Pierre Louis Desir
*Assistant Examiner* — Keisha Y. Castillo-Torres
(74) *Attorney, Agent, or Firm* — Dicke, Billig & Czaja, PLLC

(57) ABSTRACT

Systems and processes for providing differentiated advertising sponsorship of a fabricated reading product are provided. Natural language digital text characterized by a sentence, comprised of words is user selected. The text is linguistically analyzed in furtherance of displaying a fabricated reading product corresponding to the text. The words of the sentence of the text, and the sentences, are evaluated with regard to word/sentence attributes for the words of the sentences text in furtherance of supplying only the word/sentence attributes to an advertising sponsor. Based upon either or both of the word and sentence evaluation, determining whether to supply an ad from the advertising sponsor in relation to a display of the fabricated reading product, and, in connection to supplying an ad, further determining placement position of the ad in relation to the display of the fabricated reading product.

8 Claims, 19 Drawing Sheets

(56) References Cited

U.S. PATENT DOCUMENTS

| | | | |
|---|---|---|---|
| 2010/0057536 A1* | 3/2010 | Stefik | G06Q 30/0277 |
| | | | 705/26.1 |
| 2010/0057710 A1* | 3/2010 | Kanungo | G06F 16/345 |
| | | | 707/E17.014 |
| 2010/0332217 A1* | 12/2010 | Wintner | G06F 40/211 |
| | | | 704/9 |
| 2019/0020609 A1* | 1/2019 | Asukai | G06F 40/35 |

* cited by examiner

FIG. 4

|  | Item # | Position | Difficulty | POS tags | MWT-tags |
|---|---|---|---|---|---|
| New Sentence | 0 | 0 | 1 |  |  |
| Chronic | 1 | 2 | 8 | r97 |  |
| infection | 2 | 10 | 7 | a00 |  |
| can | 3 | 20 | 1 | e40, a00 |  |
| result | 4 | 24 | 5 | e46, a00 |  |
| in | 5 | 31 | 1 | B75, q97b60 |  |
| liver | 6 | 34 | 9 | A00 |  |
| or | 7 | 40 | 1 | B81 |  |
| urinary | 8 | 43 | 10 | R97 |  |
| disease | 9 | 51 | 6 | A00 |  |
| , | 10 | 58 | pc | pc |  |
| while | 11 | 60 | 3 | B10, b20q97b60 |  |
| acute | 12 | 66 | 9 | R97 |  |
| infection | 13 | 72 | 7 | A00 |  |
| may | 14 | 82 | 1 | E40 |  |
| produce | 15 | 86 | 6 | C45, a00 |  |
| rash | 16 | 94 | 4 | A00, r97 |  |
| and | 17 | 99 | 1 | B81 |  |
| a | 18 | 103 | 1 | T97, b95t99y99z99 |  |
| serum | 19 | 105 | 15 | A00, r97 | #M> |
| sickness-like | 20 | 111 | 12 | A00 | #M> |
| illness | 21 | 125 | 8 | A00 | #M |
| or | 22 | 133 | 1 | B81 |  |
| may | 23 | 136 | 1 | E40 |  |
| have | 24 | 140 | 1 | C41 |  |
| unusual | 25 | 145 | 5 | R97 |  |
| sequelae | 26 | 153 | 17 | A00, plr(y) |  |
| such as | 27 | 162 | 3 | B10, r97 |  |
| transverse | 29 | 170 | 14 | A00, r97s97 | #M> |
| myelitis | 30 | 181 | 17 | A00 | #M |
| and | 31 | 190 | 1 | B81 |  |
| paralysis | 32 | 194 | 10 | A00 |  |
| of | 33 | 204 | 1 | B75, p97b03 |  |
| the | 34 | 207 | 1 | T97, b95y99z99 |  |
| legs | 35 | 211 | 1 | A00, plr(y) |  |
|  | 36 | 212 | pp | pp |  |

FIG. 5

|  | Item # | Position | Difficulty | POS tags | MWT-tags |
|---|---|---|---|---|---|
| New Sentence | 0 | 0 | 1 |  |  |
|  | 1 | 2 | 8 | r97 |  |
|  | 2 | 10 | 7 | a00 |  |
|  | 3 | 20 | 1 | e40, a00 |  |
|  | 4 | 24 | 5 | e46, a00 |  |
|  | 5 | 31 | 1 | b75, q97b60 |  |
|  | 6 | 34 | 9 | a00 |  |
|  | 7 | 40 | 1 | b81 |  |
|  | 8 | 43 | 10 | r97 |  |
|  | 9 | 51 | 6 | a00 |  |
|  | 10 | 58 | pp | pc |  |
|  | 11 | 60 | 3 | b10, b20q97b60 |  |
|  | 12 | 66 | 9 | r97 |  |
|  | 13 | 72 | 7 | a00 |  |
|  | 14 | 82 | 1 | e40 |  |
|  | 15 | 86 | 6 | c45, a00 |  |
|  | 16 | 94 | 4 | a00, r97 |  |
|  | 17 | 99 | 1 | b81 |  |
|  | 18 | 103 | 1 | t97, b95y99z99 |  |
|  | 19 | 105 | 15 | a00, r97 | #M> |
|  | 20 | 111 | 17 | a00 | #M> |
|  | 21 | 125 | 8 | a00 | #M |
|  | 22 | 133 | 1 | b81 |  |
|  | 23 | 136 | 1 | e40 |  |
|  | 24 | 140 | 1 | c41 |  |
|  | 25 | 145 | 5 | r97 |  |
|  | 26 | 153 | 17 | a00, plr(y) |  |
|  | 27 | 162 | 3 | b10, r97 |  |
|  | 29 | 170 | 14 | a00, r97s97 | #M> |
|  | 30 | 181 | 17 | a00 | #M |
|  | 31 | 190 | 1 | b81 |  |
|  | 32 | 194 | 10 | a00 |  |
|  | 33 | 204 | 1 | b75, p97b03 |  |
|  | 34 | 207 | 1 | t97, b95y99z99 |  |
|  | 35 | 211 | 1 | a00, plr(y) |  |
|  | 36 | 212 | pp | pp |  |

FIG. 6

| S1 | # | Pos. | Diff. | POS tags | MWT-tags | MWT test |
|---|---|---|---|---|---|---|
| | 0 | 0 | 1 | | | |
| | 1 | 2 | 8 | r97 | | |
| | 2 | 10 | 7 | a00 | | |
| | 3 | 20 | 1 | e40, a00 | | |
| | 4 | 24 | 5 | e46, a00 | | |
| | 5 | 31 | 1 | b75, q97b60 | | |
| | 6 | 34 | 9 | a00 | | |
| | 7 | 40 | 1 | b81 | | |
| | 8 | 43 | 10 | r97 | | |
| | 9 | 51 | 6 | a00 | | |
| | 10 | 58 | pc | pc | | |
| | 11 | 60 | 3 | b10, b20q97b60 | | |
| | 12 | 66 | 9 | r97 | | |
| | 13 | 72 | 7 | a00 | | |
| | 14 | 82 | 1 | e40 | | |
| | 15 | 86 | 6 | c45, a00 | | |
| | 16 | 94 | 4 | a00, r97 | | |
| | 17 | 99 | 1 | b81 | | |
| | 18 | 103 | 1 | t97, b95t99y99z99 | | |
| | 19 | 105 | 15 | a00, r97 | #M> | 19~20~21 |
| | 20 | 111 | 12 | a00 | #M> | a00 |
| | 21 | 125 | 8 | a00 | #M | |
| | 22 | 133 | 1 | b81 | | |
| | 23 | 136 | 1 | e40 | | |
| | 24 | 140 | 1 | c41 | | |
| | 25 | 145 | 5 | r97 | | |
| | 26 | 153 | 17 | a00,, plr(y) | | |
| | 27 | 162 | 3 | b10, r97 | | |
| | 29 | 170 | 14 | a00, r97s97 | #M> | 29~30 |
| | 30 | 181 | 17 | a00 | #M | a00 |
| | 31 | 190 | 1 | b81 | | |
| | 32 | 194 | 10 | a00 | | |
| | 33 | 204 | 1 | b75, p97b03 | | |
| | 34 | 207 | 1 | t97, b95y99z99 | | |
| | 35 | 211 | 1 | a00, plr(y) | | |
| | 36 | 212 | pp | pp | | |

FIG. 7

| S1 | # | Pos. | Diff. | POS tags | V Rules Cycle 1, Tags | J rules Cycle 2, Tag | J rules Cycle 3, Tags | Mega-cluster rule Cycle 4, Tag | Mega-cluster rule Cycle 5, Tag | Category I Summary |
|---|---|---|---|---|---|---|---|---|---|---|
| | 0 | 0 | 1 | | | | | | | |
| | 1 | 2 | 8 | r97 | | J09, R97*A00 | | | | R97*A00 |
| | 2 | 10 | 7 | a00 | | | | | | |
| | 3 | 20 | 1 | e40, a00 | V09, E40*C46 | | | | | E40*C46 |
| | 4 | 24 | 5 | e46, a00 | | | | | | |
| | 5 | 31 | 1 | b75, q97b60 | | | J35 B75*A00 | | | B75*A00 |
| | 6 | 34 | 9 | a00 | | | | | | |
| | 7 | 40 | 1 | b81 | | | | | | B81 |
| | 8 | 43 | 10 | r97 | | J04.4, R97*A00 | | | | R97*A00 |
| | 9 | 51 | 6 | a00 | | | | | | |
| | 10 | 58 | pc | pc | | | | | | pc |
| | 11 | 60 | 3 | b10, b20q97b60 | | | | | M03BE, B35 | B35 |
| | 12 | 66 | 9 | r97 | | J04.01, R97*A00 | | M05AB, B35 | | |
| | 13 | 72 | 7 | a00 | | | | | | |
| | 14 | 82 | 1 | e40 | V03, E40*C45 | | | | | E40*C45 |
| | 15 | 86 | 6 | c45, a00 | | | | | | |
| | 16 | 94 | 4 | a00, r97 | | | | M01C z99 plr(y) | | b35 plr(y) |
| | 17 | 99 | 1 | b81 | | | | | | |
| | 18 | 103 | 1 | t97, b95t99y99z99 | | | J34.3b T97*A00 | M05AB b35 plr(y) | | |
| | 19 | 105 | 15 | MWT, | | | | | | |
| | 20 | 111 | 12 | a00 | | | | | | |
| | 21 | 125 | 8 | | | | | | | |
| | 22 | 133 | 1 | b81 | | | | | | B81 |
| | 23 | 136 | 1 | e40 | V03, E40*C41 | | | | | E40*C41 |
| | 24 | 140 | 1 | c41 | | | | | | |
| | 25 | 145 | 5 | r97 | | J09 R97*A00 | | | | R97*A00 |
| | 26 | 153 | 17 | a00, plr(y) | | | | | | |
| | 27 | 162 | 3 | b10, r97 | | J09 B10*A00 | | | | B10*A00 |
| | 29 | 170 | 14 | MWT, | | | | | | |
| | 30 | 181 | 17 | a00 | | | | | | |
| | 31 | 190 | 1 | b81 | | | | | | B81 |
| | 32 | 194 | 10 | a00 | | | | | | A00 |
| | 33 | 204 | 1 | b75, p97b03 | | | J35 B75*A00 | | | B75*A00 |
| | 34 | 207 | 1 | t97, b95y99z99 | | J20.1 T97*A00 | | | | |
| | 35 | 211 | 1 | a00, plr(y) | | | | | | |
| | 36 | 212 | pp | pp | | | | | | pp |

Output of Multi-positional, simultaneous attribute, recursive interrogation frame and tag enrichment apparatus on desemantified text

FIG. 8

| S1 | # | Pos. | Diff. | POS tags | Output of Multi-positional, simultaneous attribute, recursive interrogation frame and tag enrichment apparatus on desemantified text ||||||| 
| | | | | | Summary of Tags Cat I. | Cat II Cycle 6 Rule, Tag | Cat II, Cycle 7 Rule, Tag | Cat III Cycle 8 Rule, Tag | Cat III Cycle 9 Rule, tag | Cat III Cycle 10 Rule, Tag | Cat IV, Cycle 11 Rule, Tag |
|---|---|---|---|---|---|---|---|---|---|---|---|
| | 0 | 0 | 1 | | | | | | | | |
| | 1 | 2 | 8 | r97 | R97*A00 | U0.8.2, N03 | | | | U3.1 b54 | |
| | 2 | 10 | 7 | a00 | | | | | | | |
| | 3 | 20 | 1 | e40, a00 | E40*C46 | U0.9.1, V02 | | | U2.6, V02 | | |
| | 4 | 24 | 5 | e46, a00 | | | | | | | |
| | 5 | 31 | 1 | b75, q97b60 | B75*A00 | U0.9.3, P01 | | U1.6, P01 | | | |
| | 6 | 34 | 9 | a00 | | | | | | | |
| | 7 | 40 | 1 | b81 | B81 | | | | | | |
| | 8 | 43 | 10 | r97 | R97*A00 | | | | | | |
| | 9 | 51 | 6 | a00 | | | | | | | |
| | 10 | 58 | pc | pc | pc | | | | | | |
| | 11 | 60 | 3 | b10, b20q97b60 | B35 | | | U0.7.1, N05 | | | U3.2, b54 |
| | 12 | 66 | 9 | r97 | | | | | | | |
| | 13 | 72 | 7 | a00 | | | | | | | |
| | 14 | 82 | 1 | e40 | E40*C45 | U0.6.1, V02 | U2.5, V02 | | | U2.3.2, V13 | |
| | 15 | 86 | 5 | c45, a00 | | | | | | | |
| | 16 | 94 | 4 | a00, r97 | b35 plr(y) | | | | | | |
| | 17 | 99 | 1 | b81 | | | | | | | |
| | 18 | 103 | 1 | t97, b95t99y99z99 | | | | | | | |
| | 19 | 105 | 15 | MWT, | | | | | | | |
| | 20 | 111 | 12 | a00 | | | | | | | |
| | 21 | 125 | 8 | | | | | | | | |
| | 22 | 133 | 1 | b81 | B81 | U0.0.1, V12 | U2.5, V12 | | U2.7, V12 | | |
| | 23 | 136 | 1 | e40 | E40*C41 | | | | | | |
| | 24 | 140 | 1 | c41 | | | | | | | |
| | 25 | 145 | 5 | r97 | R97*A00 | U1.3, N05 | | U1.9, N05 | | | |
| | 26 | 153 | 17 | a00, plr(y) | | | | | | | |
| | 27 | 162 | 3 | b10, r97 | B10*A00 | | U1.7, P01 | | | | |
| | 29 | 170 | 14 | MWT, | | | | | | | |
| | 30 | 181 | 17 | a00 | | | | | | | |
| | 31 | 190 | 1 | b81 | B81 | | | | | | |
| | 32 | 194 | 10 | a00 | A00 | U1.4, N05 | | | | | |
| | 33 | 204 | 1 | b75, p97b03 | B75*a00 | | | | | | |
| | 34 | 207 | 1 | t97, b95y99z99 | | | | | | | |
| | 35 | 211 | 1 | a00, plr(y) | | | | | | | |
| | 36 | 212 | pp | pp | pp | | | | | | |

FIG. 9

| S1 # | Pos. | Diff. | POS tags | Output of Multi-positional, simultaneous attribute, recursive interrogation frame and tag enrichment apparatus on desemantified text | | | | | | | Conversion of Sentence Structure Analysis to Multidimensional Text Display Codes |
|---|---|---|---|---|---|---|---|---|---|---|---|
| | | | | Summary of Tags Cat I. | Cat II Cycle 5 Rule, Tag | Cat II, Cycle 6 Rule, Tag | Cat III Cycle 7 Rule, Tag | Cat III Cycle 8 Rule, tag | Cat III Cycle 9 Rule, Tag | Cat IV, Cycle 10 Rule, Tag | |
| 0 | 0 | 1 | | | | | | | | | |
| 1 | 2 | 8 | r97 | R97*A00 | U0.8.2, N03 | | | | U3.1 b54 | | L05 |
| 2 | 10 | 7 | a00 | | | | | | | | |
| 3 | 20 | 1 | e40, a00 | E40*C46 | U0.9.1, V02 | | | U2.6, V02 | | | L07 |
| 4 | 24 | 5 | e46, a00 | | | | | | | | |
| 5 | 31 | 1 | b75, q97b60 | B75*A00 | U0.9.3, P01 | | | U1.6, P01 | | | L12 |
| 6 | 34 | 9 | a00 | | | | | | | | |
| 7 | 40 | 1 | b81 | B81 | | | | | | | L14 |
| 8 | 43 | 10 | r97 | R97*A00 | | | | | | | |
| 9 | 51 | 6 | a00 | | | | | | | | |
| 10 | 58 | pc | pc | pc | | | | | | | |
| 11 | 60 | 3 | b10, b20q97b60 | B35 | | | U0.7.1, N05 | | | U3.2, b54 | L07 |
| 12 | 66 | 9 | r97 | | | | | | | | |
| 13 | 72 | 7 | a00 | | | | | | | | |
| 14 | 82 | 1 | e40 | E40*C45 | U0.6.1, V02 | U2.5, V02 | | | U2.3.2, V13 | | L09 |
| 15 | 86 | 6 | c45, a00 | | | | | | | | |
| 16 | 94 | 4 | a00, r97 | b35 plr(y) | | | | | | | L12 |
| 17 | 99 | 1 | b81 | | | | | | | | L13 |
| 18 | 103 | 1 | t97, b95t99y99z99 | | | | | | | | |
| 19 | 105 | 15 | MWT, | | | | | | | | |
| 20 | 111 | 12 | a00 | | | | | | | | |
| 21 | 125 | 8 | | | | | | | | | |
| 22 | 133 | 1 | b81 | B81 | U0.0.1, V12 | U2.5, V12 | | U2.7, V12 | | | L09 |
| 23 | 136 | 1 | e40 | E40*C41 | | | | | | | |
| 24 | 140 | 1 | c41 | | | | | | | | |
| 25 | 145 | 5 | r97 | R97*A00 | U1.3, N05 | | U1.9, N05 | | | | L13 |
| 26 | 153 | 17 | a00,, plr(y) | | | | | | | | |
| 27 | 162 | 3 | b10, r97 | B10*A00 | | | U1.7, P01 | | | | L17 |
| 29 | 170 | 14 | MWT, | | | | | | | | |
| 30 | 181 | 17 | a00 | | | | | | | | |
| 31 | 190 | 1 | b81 | B81 | | | | | | | L20 |
| 32 | 194 | 10 | a00 | A00 | U1.4, N05 | | | | | | |
| 33 | 204 | 1 | b75, p97b03 | B75*a00 | | | | | | | L22 |
| 34 | 207 | 1 | t97, b95y99z99 | | | | | | | | |
| 35 | 211 | 1 | a00, plr(y) | | | | | | | | |
| 36 | 212 | pp | pp | pp | | | | | | | |

FIG. 10

| S1 | # | Pos. | Indentation Values for rows, |
|---|---|---|---|
| New Sentence | 0 | 0 | |
| Chronic | 1 | 2 | L05 |
| infection | 2 | 10 | |
| can | 3 | 20 | L07 |
| result | 4 | 24 | |
| in | 5 | 31 | L12 |
| liver | 6 | 34 | |
| or | 7 | 40 | L14 |
| urinary | 8 | 43 | |
| disease | 9 | 51 | |
| | 10 | 58 | |
| while | 11 | 60 | L07 |
| acute | 12 | 66 | |
| infection | 13 | 72 | |
| may | 14 | 82 | L09 |
| produce | 15 | 86 | |
| rash | 16 | 94 | L12 |
| and | 17 | 99 | L13 |
| a | 18 | 103 | |
| serum | 19 | 105 | |
| sickness-like | 20 | 111 | |
| illness | 21 | 125 | |
| or | 22 | 133 | L09 |
| may | 23 | 136 | |
| have | 24 | 140 | |
| unusual | 25 | 145 | L13 |
| sequelae | 26 | 153 | |
| such as | 27 | 162 | L17 |
| transverse | 29 | 170 | |
| myelitis | 30 | 181 | |
| and | 31 | 190 | L20 |
| paralysis | 32 | 194 | |
| of | 33 | 204 | L22 |
| the | 34 | 207 | |
| legs | 35 | 211 | |
| | 36 | 212 | |

OUTPUT OF READABILITY SERVICE

Chronic infection
   can result
      in liver
         or urinary disease,
   while acute infection
      may produce
         rash
         and a serum sickness-like illness
   or may have
      unusual sequelae
         such as transverse myelitis
         and paralysis
           of the legs.

Displayed Text on Reading Platform

FIG. 13

| Left column | | Right column | |
|---|---|---|---|
| But,<br>  in a larger sense,<br>    we can not dedicate<br>      -- we can not consecrate<br>    -- we can not hallow<br>    -- this ground.<br><br>The brave men,<br>  living and dead,<br>  who struggled here,<br>  have consecrated it,<br>    far above<br>      our poor power<br>        to add or detract. | 18sec | But,<br>  in a larger sense,<br>    we can not dedicate<br>      -- we can not consecrate<br>    -- we can not hallow<br>    -- this ground.<br><br>The brave men,<br>  living and dead,<br>  who struggled here,<br>  have consecrated it,<br>    far above<br>      our poor power<br>        to add or detract. | 18sec |
| The world will little note,<br>  nor long remember<br>    what we<br>      say here,<br>  but it<br>  can never forget<br>    what they<br>      did here. | 20 sec | The world will little note,<br>  nor long remember<br>    what we<br>      say here,<br>  but it<br>  can never forget<br>    what they<br>      did here.<br><br>*AD FOR FAST-FOOD HAMBURGER* | 27 sec |
| It is<br>  for us the living,<br>  rather,<br>    to be dedicated here<br>      to the unfinished work which<br>      they who fought here<br>        have thus far<br>          so nobly advanced.<br><br>It is rather<br>  for us<br>    to be here dedicated<br>      to the great task | 22 sec | It is<br>  for us the living,<br>  rather,<br>    to be dedicated here<br>      to the unfinished work which<br>      they who fought here<br>        have thus far<br>          so nobly advanced.<br><br>It is rather<br>  for us<br>    to be here dedicated<br>      to the great task | 29 sec |
|    remaining<br>      before us<br>  -- that<br>    from these<br>      honored dead<br>      we take<br>      increased<br>    devotion to<br>      that cause<br>        for which they gave<br>          the last full measure<br>          of devotion<br>  -- that<br>    we here highly resolve<br>      that<br>        these<br>          dead shall not have died<br>            in vain<br>  -- that this nation,<br>    under God,<br>      shall have a new birth<br>        of freedom<br>  -- and<br>    that government<br>      of the people,<br>        by the people,<br>          for the people,<br>    shall not perish<br>      from the earth. | 17 sec |    remaining<br>      before us<br>  -- that<br>    from these<br>      honored dead<br>      we take<br>      increased<br>    devotion to<br>      that cause<br>        for which they gave<br>          the last full measure<br>          of devotion<br>  -- that<br>    we here highly resolve<br>      that<br>        these<br>          dead shall not have died<br>            in vain<br>  -- that this nation,<br>    under God,<br>      shall have a new birth<br>        of freedom<br>  -- and<br>    that government<br>      of the people,<br>        by the people,<br>          for the people,<br>    shall not perish<br>      from the earth. | 27sec | scroll >>

FIG. 14

| A | B | C | D | E | F | G | H | I | J | K |
|---|---|---|---|---|---|---|---|---|---|---|
| Step No. | Look for any entity, x, whose value is: | If x+1 is | and x-1 is | and x+2 is | and x+n is | and (x+n)+1 is | Then create a cluster with x and its neighbors as: | And label the new combination as: | After doing step for all candidates, go to step: | Otherwise, if no operation, go to step: |
|   |   |   |   |   |   |   |   |   |   |   |

FIG. 15

| A | B | C | D | E | E.2 | E.3 | F | G | H | I |
|---|---|---|---|---|---|---|---|---|---|---|
| Step | Look in the segment for a word x, whose value is: | If x+1 is | And x-1 is | And x+2 is | x+n | (x+n)+1 | Then create a cluster with x and its neighbors as | And place the combination in the temporary wowparse list in the category below, then go to step in next column. | After doing step for all candidates, go to step : | Otherwise, if no operation, go to step |
| J48.0e | r97 or s97 or a00 (as in navigation) *or b01 not ending in the letter s (i.e., not plural). | c45 or c46 | prep. b75, "of" (But not "to") | c45, c46, f45, f46 | n=3 not any post-verb dis-ambmig-uator: z99 (a, the, those, etc.); or y99 (me, us, my, our, etc.) Not an adverb. (b60, q97); not an a03 | | (x-1) ~ x ~ (x+1) ~ (x+2) | a03 (derived true simple noun-phase). | J5 | J6 |
| J48.0h | r97 or s97 | b01 not ending in plain lower case s; but b01 ending in 's or s' is OK.. | prep. b75, or x99; a word ending in 's or s', the word "no" | c45 or c46 | n=3 c45 or e45 | n=4 not any post-verb dis-ambigua tor: z99 or y99( me, us, my, our, yours, etc. ) hers. Not an adverb. (b60, q97); not an a03. | x~(x+1)~(x+2)~(x+3) | a02 | J5 | J6 |

FIG. 16

| A | B | C | D | E | E.2 | E.3 | F | G | H | I |
|---|---|---|---|---|---|---|---|---|---|---|
| Step | Look in the segment for a word x, whose value is: | If x+1 is | And x-1 is | And (x+n)-1 is | x+n | (x+n)+1 | Then create a cluster with x and its neighbors as | And place the combination in the temporary wowparse list in the category below, then go to step in next column. | After doing step for all candidates, go to step: | Otherwise, if no operation, go to step |
| NPT-01 | A number word greater than "one"; or one of these words: "several, many, some, all, few, most," | Pre-adjectival Determiner PJD (q96); or; True Adjective (r97), Or a singular a00, Or a C45; Or d45 | A preposition (b72) | True Adjective (r97), Or a singular a00, Or a C45; (or nothing, i.e., n=2, and only x+1 is between x and x+n) | (n=3, 4, 5 etc.) A plural a00, or an e45 ;or a b05 (plural word not ending in s, such as children, or geese). | A preposition; or a 40, 41, 42, or 43 verb; or an e45 or e46 verb | (x-1)~x~(x+n) | B75 Example: [<with several city capacity blocks>] for]; do not include the prep ("for") at (x+n)+1 in the group. | NPT-02 | Adverb steps |
| NPT-02 | Pre-adjectival Determiner PJD (q96); or; True Adjective (r97), Or a singular a00, Or a C45 | True Adjective (r97), Or a singular a00, Or a C45 | A preposition | True Adjective (r97), Or a singular a00, Or a C45 (or nothing, i.e., n=2, and only x+1 is between x and x+n) | A plural a00, or an e45; or a b05 (plural word not ending in s, such as children, or geese). | A preposition; or a 40, 41, 42, or 43 verb; or an e45 or e46 verb | (x-1)~x~(x+n) | B75 Example: [<with very large association blocks>] is]; do not include the e42 ("is") at (x+n)+1 in the group. | NPT-03 | Adverb steps |

FIG. 17

| A | B | C | D | E | F | G | H | I | J | K |
|---|---|---|---|---|---|---|---|---|---|---|
| Step | Look for any word, x, whose value is: | If x+1 is | and x-1 is | and x+2 is | x+n is see changes in rows | (x+n)+1 see changes in rows | Then create a cluster with x and its neighbors as | Add label the new combin-ation as: | After doing step for all can-didates, go to step: | Otherwise, if no operation, go to step (and notes) |
| U1.4 | z99 with the leading noun inside the z99 is singular, or an N03 | see col F | not a preposition (i.e, not a plain preposition b75) not a 40, 41, 42, 43, or 45 word | see col F | anything but not a b35, not another z99, Not N03, N04, N05, N06, not Not V01, V02, V03, V04, V06, V08, not a verb, not a b52, not V12, V14, V16, V18; not V13, V15, V17, V19 and also NOT a P01 | e-verb, or V01 or other verbs that are the following or verb phrases (previously clustered) whose first verb is: "could, would, should, will, shall, do, did, is, was, has, had"; or d44 or d45 verbs. | x~(x+n) ; add label, as in col I; if these conditions are not met, leave x and segment as is | add label for the segment x~(x+n) as N04 add label (x+n)+1 as V02 | | *the segment is now upgraded to an N04, and is waiting for the verb it "touched" to become "closed"; this N04 will not be re-examined internally, but it will be able to block production of an N04 or N06 until it combines with its verb, to become a "transparent" b54, which is permitted at (x+n) |

READING ASSISTANCE SPONSORSHIP SYSTEM AND METHODOLGY

This is a United States utility patent application, filed under 35 U.S.C. § 111(a) and 37 CFR § 1.53(b), claiming priority under 35 U.S.C. § 120 to U.S. Pat. Appl. Ser. No. 62/970,251 filed Feb. 5, 2020 and entitled READING ASSISTANCE SPONSORSHIP AND PRIVACY OPTIMIZATION (RASPO) SYSTEM, the disclosure of which is hereby incorporated by reference in its entirety.

TECHNICAL FIELD

The present invention is generally directed to digital text presentations in the form of reading product fabrications for supported and/or assisted digital reading, more particularly, to systems, services, methods, and/or processes which enable reading assistance sponsorship, more particularly, to improved readability enhancement systems, services, methods, processes, etc. wherein sponsored content supplements a displayed reading product fabrication, more particularly still, and optionally, to sponsored content of such supplemented display having origins in, among other things, an enriched desemantified version of the user select text and/or user specified parameters for the sponsored content.

BACKGROUND

Reading text from screens has both advantages and disadvantages. Many readers still prefer paper to screen displays of text. However, persons with a reading/vision limitation, such as dyslexia or low-vision, or advanced age, now have new digital tools that make screen reading much better than paper for them. Moreover, as a result of the ongoing pandemic, screen time is arguably at an all-time high, with device users more likely than ever to view content and specifically read text from home.

Some accommodations that assist persons with reading limitations are integrated into the operating system of the device they are using. These include, for example, the Magnifier enlargement feature of Windows® software (Microsoft Corp., WA, USA) characterized by screen magnification and invert colors options. Also, similar "Reader View" options are present in a variety of offerings of Apple (CA, USA), e.g., iOS operating system for iPhone® and iPad® handheld devices, and the Safari® browser. However, these accommodations simply modify the visual properties of the displayed text, for example, any one or more of text display, color, size and style. While such visual property enhancement to traditionally displayed block text in fact supports a subset of displayed text readers, it does not go beyond reading. It essentially is recognition, not cognition.

There are also ways to linguistically analyze text for improved display (e.g., screen layout in two dimensional space) to support cognition. The results of the analysis are methodically used to vary the perceptible properties of the displayed text for improved readability (see e.g., the work of Randall Walker/Walker Reading Technologies, Inc. MN, USA, with regard to reading product fabrication, e.g., U.S. Pat. Nos. 7,861,163, 9,390,080, 9,940,317, 10,650,089 & 10,515,138, the disclosures of each incorporated by reference in their entireties; see also http://livelink.com/ with regard to the formation of selectively organized visual information zones comprised of sentence elements).

Leveraging the use of the analysis as indicated, both on the text in machine-readable form and with the text in its perceptible form for human reading, is beyond the scope of the operating system of a device, and involves substantial cost to develop, deliver and support. Such automated methods are known to be useful for not only persons with reading disabilities, but also for students and a wide range of otherwise normally proficient readers who can further improve their reading efficiency, without losing accuracy, when reading technical, mission-critical and time-dependent materials. The methods, embodied as products and/or services, oftentimes comprise stand-alone software programs installed on an end-user's device, or as software-as-service (SAS) subscriptions that perform complex text analysis on remote computers, sent via the internet.

Heretofore, and presently, many digital products and services include advertising in conjunction with the digital product or service to be displayed on the screen as a common method to obtain revenue that is intended to at least cover the cost to provide that service. For example, advertisers can purchase positions on a list of products that a user might have been seeking with search engines such as the Goggle® search engine of Alphabet Inc. (CA, USA). Similarly, the YouTube® video sharing platform (Alphabet Inc. (CA, USA)) can display a brief advertisement that must be viewed, in whole or in part, before the main video that was sought is displayed.

Advertising strategies, more often than not, are complex. The type of ad to be shown can be varied based on the subject area of the sought material. For example, a search on the internet for "Australia" could be linked with ads for hotels or vacation tours in Australia. The type of ad can also be linked with an analysis of the end-user's digital activities. These activities can be traced through the user's interactions with the product, as well as other user-specific information that might be stored on the device. Mobile devices, for example, can include locations in space and time where the user is and goes. Moreover, complex algorithms, for example those developed by Facebook, Inc. (CA, USA), a company that also provides its services for free by obtaining revenue from advertising, analyze users' direct interactions in relation to its FaceBook® social media and/or network platform/services, (e.g. the use of user "likes"), and other personal information stored on their devices, as well as the users' connections with other platform/service users and these other users' information and connections with yet more users.

Because the production and delivery of a complex, text-analysis/varied display product or service for improved readability, i.e., an enhanced or fabricated reading or readability product, is costly, one might think to straight-up adapt these existing methods for customizing advertising for such a readability product. But therein lies the rub; insofar as the user needs assistance for their reading performance, the presence of ads in or in conjunction with the enhanced readability product is likely to interfere with the very reading performance that the user is trying to improve with the readability enhancement service. That said, this seeming paradox has been viewed not as an obstacle, but as an opportunity by the Applicant. Moreover, it is believed that there are also new possibilities in a customized advertising approach that are not otherwise available, feasible or even contemplated as being advantageous in the realm of advertising-sponsored services, search engines, social media and/or sponsored content.

Thus, as costs associated with development, building and delivering software products and services that use the linguistic content of text to change the perceptible appearance of the text for improved readability prohibit, or at least hamstring wide spread access to the very readers who need the readability product the most, and/or to those that may benefit the most from such product or service, and, as application of the present sponsored content paradigm is ill suited to offset costs associated with development, building and delivering such software products and/or services as has been noted, it is believed desirable and advantageous to make sponsored advertising more precise and effective, which could be of mutual benefit to the user and the advertiser, by further leveraging the content of the text and/or an abstraction of same, the user's engagement with the text, and many other unique variables that are made possible when a text's linguistic content is analyzed for modified display. However, this more detailed analysis of the user and the user's texts, comes at a higher personal price. i.e., the risk of loss of privacy about, e.g., what one reads, where, when, and how well. Again, this personal price in potential loss of privacy, would be disproportionately born by those who most need the readability support. Thus, to mitigate such a risk for those seeking to retain a degree of privacy, it is further believed desirable and advantageous to provide a system that permits the end-user to leverage the specificity of the text and the user's interactions with the text, made possible by more complex analytics of the texts that the user uses the readability product for, to control and direct the type and degree of data extraction from their submitted texts, and the frequency and types of text content with which supportive advertising would be associated, and the type and placement of such associated advertising.

SUMMARY OF THE INVENTION

Systems and processes for providing differentiated advertising sponsorship of a fabricated reading product are provided. User select natural language digital text is identified the text characterized by a sentence, the sentence characterized by words. The text is linguistically analyzing in furtherance of displaying a fabricated reading product corresponding to the text. The words of the sentence of the text are evaluated with regard to word attributes for the words of the sentences of text in furtherance of supplying the word attributes to an advertising sponsor. The sentence of the text are evaluated with regard to sentence attributes for the sentence of the text in furtherance of supplying the sentence attributes to the advertising sponsor. Based upon either or both of the word and sentence evaluation, whether to supply an ad from the advertising sponsor in relation to a display of the fabricated reading product is determined, and, in connection to supplying an ad, placement position of the ad in relation to the display of the fabricated reading product is further determined.

Word attributes generally comprise one or more of word difficulty, part-of-speech, and/or multiple possible parts of speech. Word difficult may be fairly characterized by word length, syllable number, and/or grade level. Sentence readability indicia is characterized by one or more of sentence difficulty, sentence ambiguity, and/or sentence complexity. Sentence difficulty may be fairly characterized by word count number. Sentence ambiguity may be fairly characterized by multi-word terms. Sentence complexity may be fairly characterized by a presence of one or more of independent clauses, compound verb phrases, and/or compound noun phrases.

Advantageously, but not necessarily, the user select natural language digital text for evaluation has undergone a substitution process whereby words of the sentence of the text are systematically replaced with tags that correlate to a word attribute of word attributes for the words of the select natural language digital text so as to delimit a desemantified text. The desemantified text thereby providing a degree of privacy for the user relative to the advertising sponsor in connection to the determination of whether to supply an ad from the advertising sponsor, and in connection to the supplying of the ad from the advertising sponsor. Moreover, and advantageously, the desemantified text is subject of the evaluation of the sentence of the user select natural language digital text with regard to the sentence attributes. More specific features and advantages obtained in view of the summarized features will become apparent with reference to the drawing figures and DETAILED DESCRIPTION OF THE INVENTION.

BRIEF DESCRIPTION OF THE DRAWINGS

All drawings have been prepared, and are included to facilitate and/or enhance an understanding of the basic teachings of the contemplated embodiments, and/or the concepts underlying same, and are incorporated in and constitute a part of this specification. While the drawings illustrate examples and/or embodiments, and permutations thereof/with respect thereto, as the case may be, and/or context with respect thereto, each alone or in combination, together with the description, serve to highlight principles of embodiments and/or features thereof, other embodiments, and many of the intended advantages of the disclosed systems, subsystems, devices, mechanisms, methods, operations, processes, etc., will be readily appreciated as they become better understood by reference to the following detailed description and drawings.

FIGS. 1-17 are provided herewith wherein:

FIG. 3 schematically and conceptually illustrates advantageous, non-limiting text desemantification and text enrichment features/process part-and-parcel of the reading assistance sponsorship process of FIGS. 2A, 2B, FIGS. 4-10 subsequently presenting select illustrative processing "outputs";

FIG. 4 illustrates, tabular form, an initial text enrichment with semantic word attributes as per FIG. 3 for a sample user text, word, item, position, difficulty, part-of-speech tags and multi-word term tag columns indicated;

FIG. 5 illustrates, tabular form, a desemantified version of the initial text enrichment with semantic word attributes of FIG. 4;

FIG. 6 illustrates, tabular form, sentence specific, context based word attribute extraction from the desemantified text (FIG. 5) with tag enrichment, more particularly, multi-word term validation with context testing (i.e., use of context rules to disambiguate the word to the extent a word of the multi-word term has more than one meaning);

FIG. 7 illustrates, tabular form, partial results (Category I) of a readability assessment (i.e., sentence attribute evaluation), more particularly, an assessment characterized by multi-positional, simultaneous-attribute, and recursive interrogation with nested tag enrichment, using attribute tags only, in connection to desemantifed text (FIG. 5);

FIG. 8 illustrates, tabular form, further results (Category II-IV) of a multi-positional, simultaneous-attribute, and recursive interrogation with nested tag enrichment process, using attribute tags only, in connection to desemantifed text (FIG. 5);

FIG. 9 illustrates, tabular form, conversion of the sentence structure analysis to display tags or codes, more particularly, attribute extraction tag conversion into multidimensional display parameters in relation to the representations of interrogation results (FIGS. 7/8);

FIG. 10 illustrates, tabular form, re-semantification of the desemantified text string with multidimensional display tags (FIG. 9), subsequent to the readability assessment (FIG. 8);

FIG. 12 illustrates an optional credit/debit schema/exchange to supplement the contemplated differentiated advertising sponsorship system/process for reading assistance sponsorship in/for a fabricated reading product;

FIG. 13 illustrates an optional and exemplary reading time per screen view feature for a fabricated reading product with and without sponsored advertising;

FIG. 14 illustrates a desemantified test string interrogation framework, tabular format, row headers, part-and-parcel of the contemplated readability assessment, i.e., sentence attribute evaluation, yielding results as per FIGS. 7/8;

FIG. 15 illustrates a representative, non-limiting a desemantified test string interrogation, namely, application of adjective pre-cluster rules;

FIG. 16 illustrates a representative, non-limiting a desemantified test string interrogation, namely, application of noun phrase tie rules; and, FIG. 17 illustrates a representative, non-limiting a desemantified test string interrogation, namely, application of non-adjacent term/word assessment rules.

DETAILED DESCRIPTION OF THE INVENTION(S)

In advance of particulars for contemplated and advantageous systems, devices, methods, and/or processes in relation to offering or supplying differentiated advertising sponsorship in or for a fabricated reading product, including numerous and varied permutations thereof, some preliminary observations are warranted. More particularly, an overview of the disclosure immediately follows, a discussion of the opportunity presented in connection to Applicant's endeavor and layered solutions to providing differentiated advertising sponsorship in/for a fabricated reading product follows thereafter, with particulars for the underlying approach and robust plural features set forth thereafter.

Figure 2A:
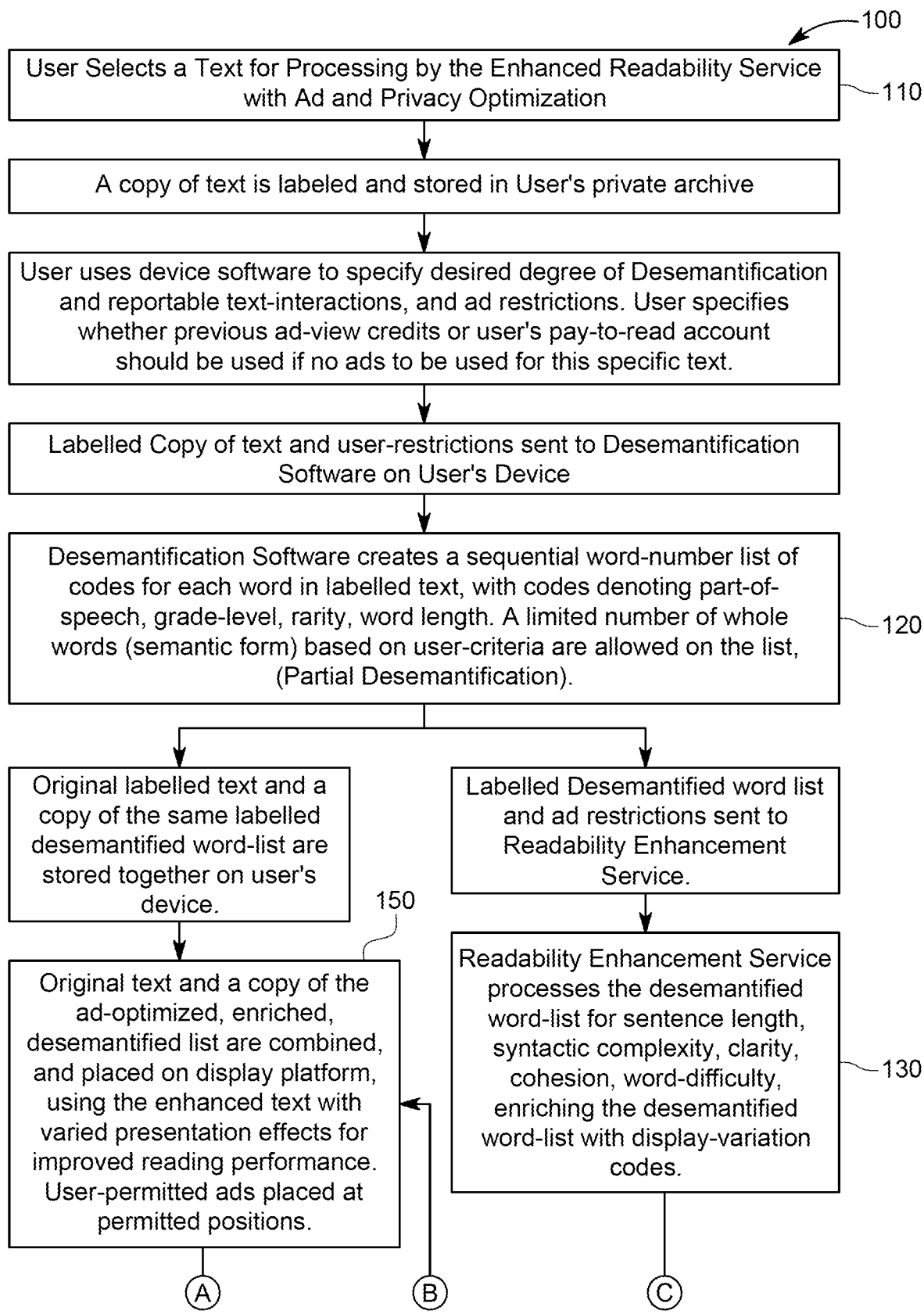
FIGS. 2A, 2B schematically and functionally illustrate an especially robust, advantageous and non-limiting process of optimizing differentiated advertising for contemplated reading assistance sponsorship in/for a fabricated reading product, supplemental features indicated.
Figure 2B:
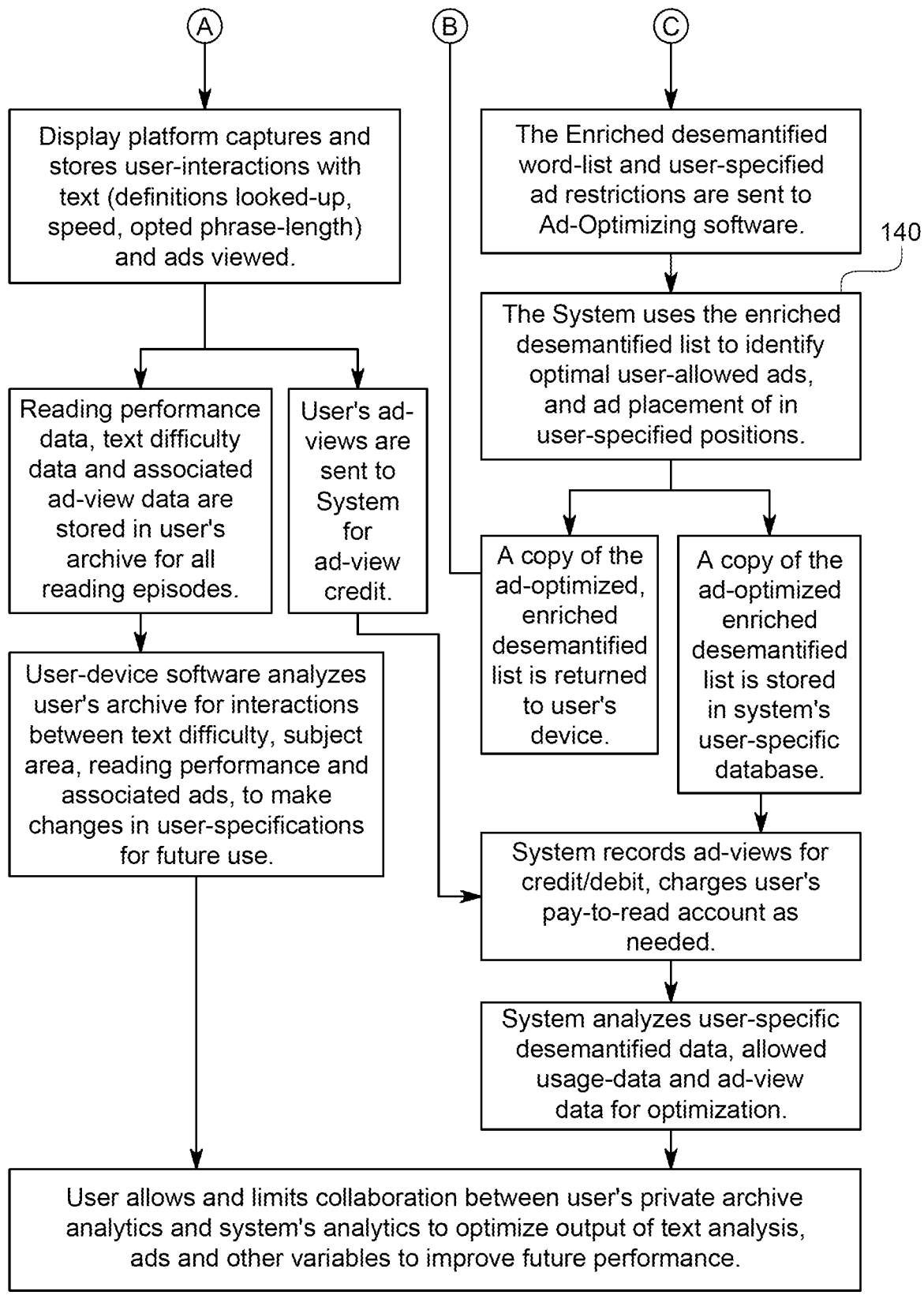
Figure 3:
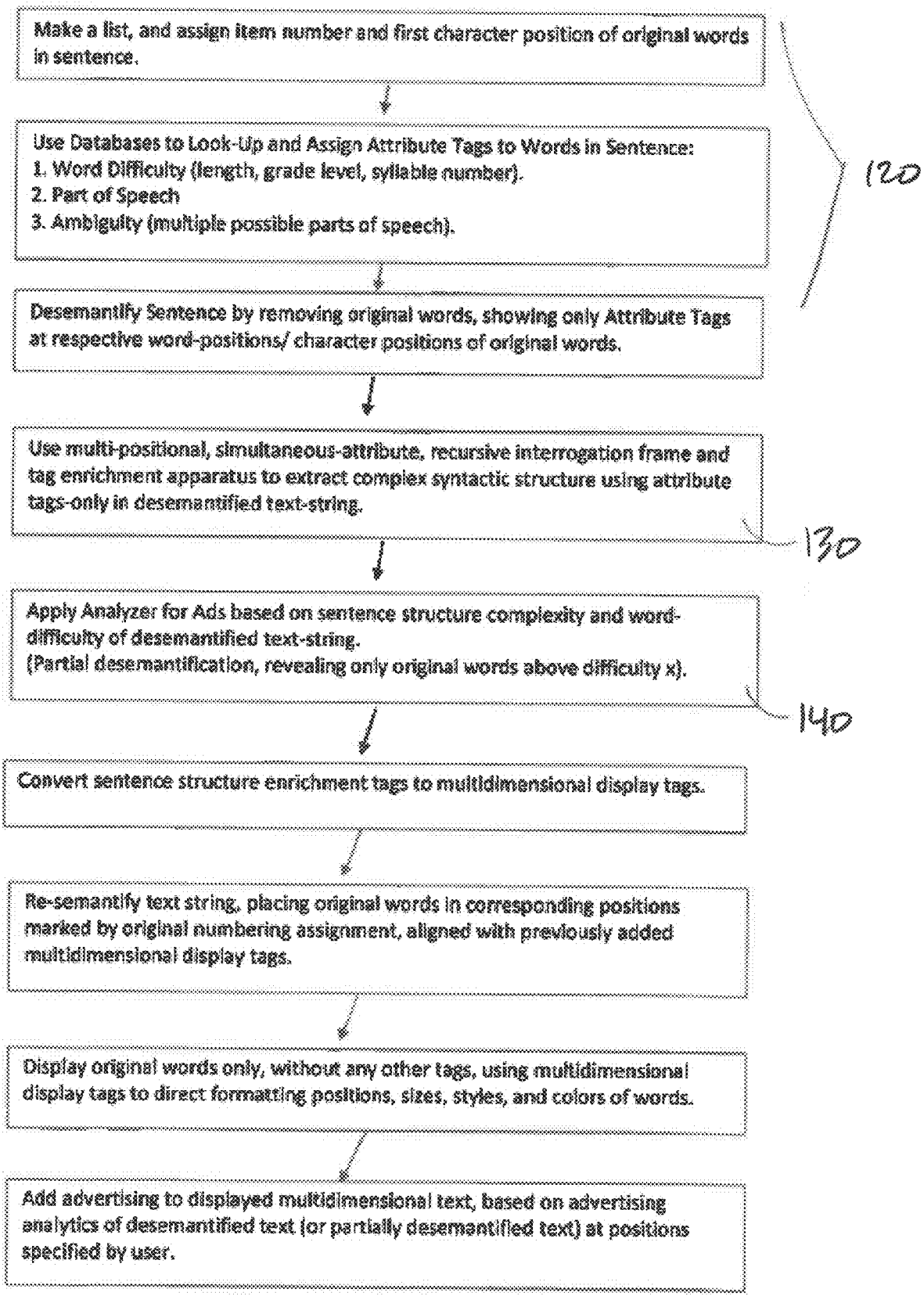

A variety of demonstrative material, in the form of schematic illustrations and tables, is integral to the instant disclosure. Representations of a robust overarching system and process are depicted in each of FIGS. 1 (1A, 1B) & 2 (2A, 2B) respectively. It is to be readily appreciated that system elements or components are referenced with regard to function, with known and later developed hardware, software, algorithms, etc. for the system and/or one or more subsystems thereof contemplated. Moreover, it is to be further readily appreciated that one or more process sub-steps of the soup-to-nuts process set forth are believed per se desirable and advantageous. An optional, advantageous, high value text desemantification and text enrichment feature/process for a user select natural language digital text, as per the FIG. 2 (2A, 2B) process, is particularized in connection to the sub processes depiction FIG. 3, illustrations of steps thereof provided in connection to a sample user select natural language digital text FIGS. 4-11, with FIGS. 14-17 illuminating representative, non-limiting rules based interrogations implicated in obtaining a reading valuation (i.e., sentence attribute evaluation, FIGS. 7/8). Finally, further advantageous, optional process features are illustrated in connection to FIGS. 12 & 13, namely, ad view, trading, cross platform ad show exchange notions, and user reading performance assessment in relation to sponsored advertising in a fabricated reading product.

Opportunities touching upon the contemplated differentiated advertising sponsorship of a fabricated reading product are numerous and novel relative to heretofore paradigms. For instance, the user's specific request to submit a particular passage of text for improved readability, to a system, service, app, module, etc. that linguistically analyzes the submitted text and varies the visual appearance of the text for improved readability, creates new user-specific information and text-specific information, separately and together, that can be valuable for personalizing and optimizing the associated advertising that might be used to sponsor the user's use of the readability system/service. The particular text being submitted contains, by the very fact of its submission by a specific user to an enhanced readability service, the information that this particular user intends to read that particular text carefully for its meaning. The text being submitted for the readability service is not being casually scanned or perused; it is text that the submitter has assigned a personal value to for comprehending. The text, in turn, contains more information than its mere subject area.

The same text, in the process of being analyzed to modify its visual display for better readability, can also be analyzed, with regard to either or both of word and sentence attributes of the text, for such factors as, for example and without limitation, word grade-level difficulty, vocabulary difficulty, sentence length, and the syntactic complexity and semantic clarity of its sentences. Further, the text being submitted by the user can be analyzed for its coherence, the property of sequential sentences meeting criteria for relatedness and logical progression, and other logic properties.

More still, these and other text-specific variables can also be analyzed in conjunction with user-specific variables. For example, a repository (e.g., database) for the user's prior text submissions can be examined to determine if the user has read similar texts in the past, based on subject area, lexical difficulty or syntactic complexity, and other properties of the previously read texts. Other user-specific variables can include frequency of use of the readability service/reading product fabricator, and the proportionate use of the service/fabricator relative to overall use of the user's device, or internet browser for internet content. User-specific variables, which can be combined with text-specific variables, can also include information on where and when texts are submitted for readability processing, and, if the user's "account" covers multiple devices, which type of device (e.g., personal computer (PC), smartphone or tablet) is used.

Further still, a fabricated reading product can also be delivered for display upon a proprietary display platform, for example and without limitation, via a personal home page (PHP) program that operates on web-browsers, or an iOS program that operates on iPhones or iPads, and that could capture finer detail about the user's interaction with the displayed text while reading it. These interactions could include whether, and for which words, a user checks a word's definition. The text display platform can enable the user to vary the extent and manner of text presentation variables, such as preferred phrase-length, color choices, and highlighting effects. Also, such a proprietary text display platform can estimate reading speed.

For example, by splitting the enhanced text across discrete pages, advanced by clicking, one can estimate words per page and time per page before advancing to the next page. Alternatively, if the user elects to scroll the text, the proprietary enhanced text display platform could include markers, for example, every 100 words, and then capture the time points when those markers are scrolled up off the screen. It is also possible, with such word-number markers, to estimate how far into the text the reader has gone, with each encounter, e.g., for bookmarking purposes, and across all encounters with the same text, if read in separate episodes, to determine percentage read. These additional variables can then be added to the sets of user-specific variables that can be used to differentiate and optimize the inclusion of sponsoring advertisements that support the delivery of the readability enhancement service/product.

Over time, with a database that stores all of the text ever submitted to the readability service, the system can assess how a reader's use of the service might evolve over time. The system can estimate a progression, or regression, of the difficulty level of the submitted texts over time. The system can estimate how the reader's speed and completion rate evolve over time. Moreover, the system can monitor how the reader's distractibility by advertising can vary, (e.g., a drop in reading speed relative to one's usual, difficulty-adjusted reading speed, or, frequency of stopping to click on ads that appear in conjunction with the text), based on circumstance or text difficulty; and over time, how distractibility can change with advancing practice (i.e., less distractible), or, with advancing age (i.e., more distractible), which can be used to dynamically modify future use instances of enhanced readability services. Combined, an improvement in these variables can be used in students to gauge academic progress. Alternatively, in older readers, a decline in speed or a rise in distractibility, or changes in similar variables, over time, could be an early indicator of cognitive decline that might warrant further professional evaluation and potential intervention.

These additional layers of information, being derived from extensive analysis of a particular text that was submitted for a readability enhancement service/preparation of a fabricated reading product and having user-assigned value, based on the submission itself, that the user intends to read that particular text carefully for its meaning, can be used, not only to increase the precision and effectiveness of sponsoring advertisements to be shown in conjunction with the fabricated reading product, but can also be used, through analytics of both the user's variables and the text's variables, to determine that no advertising at all should be added to a particular text.

The delivery of complex text analysis and varied display, for improved readability, varies across the population, and even within an individual reader. For example, adolescent readers preparing homework from internet pages for their history class, e.g., the Federalist Papers, particularly if they have reading or learning disabilities, would be distracted from their studies if advertising was inserted or added to the delivery of the text-analysis/varied-display readability product. Persons with reading or learning disabilities, as well as adolescents and children, or any consumer wishing more privacy, can also be protected from having select or even confidential information obtained about their reading activities.

The readability enhancement service/reading product fabricator can use its text analytics algorithms/programs to remove information from the text content, such as subject area, while still analyzing the text for word and/or sentence attributes or variables such as, without limitation, syntactic complexity, or grade-level difficulty of the words of the text. This can be accomplished, as will later be detailed, by first performing a substitution procedure that assigns special tags or codes to words in the submitted text, for example part-of-speech and grade-level difficulty, and then removing the actual words, with the analytics being performed on the assigned code version of the text. This process is referend to desemantification, with a desemantified text being thereby produced. In this way, sponsoring advertisements could still be used, to the extent the "facts" meet a select criteria/criterion for the inclusion of sponsored content in the fabricated reading product, or deliberately not used, for particular texts or particular readers, without tracking subject-area information on the texts that the user had submitted for enhanced readability.

The extent of the contemplated desemantification process can vary, by degree and by qualitative criteria, it provides the end-user a range of possibilities. For example, partial desemantification could permit inclusion of the top ten most-frequently used words within the text that are not function words; and/or the top-ten words in the text that are the most rarely words in the general press. These partial semantic impressions could help place the text within user-specified categories (e.g., articles about photography) without revealing to the enhanced readability service what the full content of the submitted text was. Moreover, in the context of an optional potential proprietary display platform for such reading assistance sponsorship system, which could be software installed on the user's device in a privacy-protected compartment, user's interactions with the enhanced text (e.g., definitions looked-up, reading speed, document completion) may be readily separated and controlling shared or otherwise revealed to the system's advertising module or component which could be hosted remotely via the internet.

Further still, the system can optionally incorporate or provide access to general information about the reader that the reader voluntarily submits (e.g., date of birth), or that can be reasonably predicted from patterns of the reader's use of the readability service, e.g., from the subject areas and difficulty levels of texts the reader submits. This information, in turn, can be used to vary the delivery of sponsoring advertisements as well, including whether to include any advertisement at all. For example, a reader who is determined, voluntarily or by deduction, to be 16 years old, and whose prior use of the readability service shows a potential reading disability, e.g., prior texts at a 12 year old level were read at a below-average for age speed of 80 words per minute, may be allowed to use the readability enhancement service for any text deemed educationally important, based for instance on analytics of the text, and at a difficulty level of age 13 or greater, without advertising.

The system may be, optionally, a "blended" system/process, combining advertising-based sponsorship and a user's pay-to-read account. The reader can also accrue advertisements-viewed as credits, for example, by allowing more frequent advertising during one's leisure reading. Then, when the reader encounters a particular text that the reader needs to read urgently, and carefully, but for which reading-disability criteria for withholding advertising are not met, the reader can nonetheless opt to use one's previously accrued advertisements-viewed credits to receive the special text, under these circumstances, without advertising and also without using their pay-to-read account. Moreover, it is contemplated that such advertisements-viewed credits could also be shared between users of the readability service.

For example, the advertisements that parents might view in their day-to-day use of the readability enhancement service could be used to assure that their school-age children can always use the readability enhancement service without any advertisements. Similarly, persons who use the readability enhancement service with texts for which they tolerate intermittent advertising, for example reading material for enjoyment rather than for work or study, can also redirect the value of their advertisements-viewed credits to an organization, e.g., the International Dyslexia Association, that supports children who need the readability enhancement service for their education, to enable the children to use the readability enhancement service without any advertising at all.

Further still, in such robust version of the contemplated differentiated advertising sponsorship system/process, a further user option of transferring advertisements to alternative digital services is believed desirable and advantageous. For example, if the user had allowed semantic analytics, i.e., texts not having desemantification performed, to be included in the analysis of submitted texts for the enhanced readability product, but the user also wanted to defer or transfer advertising with the readability product's enhanced display of a particular text, the same semantic analytics for that user could be directed to optimize advertising in a different product or service, such as a video-streaming service, while keeping the enhanced readability display of the actual text free of any advertising. By way of illustration, a reader of texts directed to soil conservation could use the fabricated reading product, with no advertising with the text; however, when using a different product, such as a social media video service, the information gleaned from the user's reading of texts on soil conservation could be used to optimize ads to be included with the video recording or video streaming service.

It is possible that some users would find that, in certain circumstances, it would be desirable to be shown advertisements, in conjunction with their reading of text that is presented with the readability enhancement service. The advertisements may be presenting information about new products that the user would like to learn more about. For example, farmers reading agricultural business journals may wish to see advertisements about certain types of new fertilizers of equipment; artists may wish to see advertisements about new kinds of acrylic paint. Nonetheless, it is still possible that these users would prefer to be able to control these advertisements: e.g., what category of products to be advertised; or where within the reading material will the ad be presented (e.g., before, after, inserted within, or alongside); or what type of reading, or reading situation, should no advertising be shown, advantageously with the user deferring these ad-views to other circumstances, or using their pay-to-read account.

Moreover, the extensive analytics performed by the readability enhancement service/reading product fabricator on (a) the linguistic content of texts being submitted, (e.g., syntactic complexity and grade-level, with or without desemantification), and (b) the reader's varying interactions with the displayed reading product, e.g., clicking on words for definitions, reading speed, when combined with (c) a database of the varying ways in which ads may, or may not, be shown in conjunction with the text for reading in the fabricated reading product, further creates even more data on the interaction between various ad variables and a reader's reading performance, such as reading speed at a particular level of text difficulty, which can be analyzed as well. In this way, the differentiation of advertising sponsorship can be optimized for the benefit of the reader, minimizing any deleterious effect of an ad on one's reading performance, especially when reading material for study or mission-critical work, while strategically including ads in circumstances that improve the value of the advertisement for lowering the user's cost for overall use of the readability enhancement service, keeping use of the user's pay-to-read account at the lowest possible level.

Furthermore, the composite effect of a robust combined system/service, i.e., providing a readability enhanced product that uses linguistic analysis to vary the perceptible display of the text, combined with differentiated advertising sponsorship that is unobtrusive during critical reading, provides yet further useful advertising at suitable occasions, while further protecting the privacy of the user (i.e., the content of the texts the user is reading by using varied desemantification based on the user's controls), creates a means to make the overall reading support service that much more robust, while still fulfilling the user's wishes for low cost (i.e., minimizing use of one's pay-to-read account), and a high level of privacy. For example, the system could provide a means to privately store every text the user has ever read with the readability enhancement service. This large body of text could then be used to track the evolution of the reader's reading performance over time, provide a means to recover previously read material, review vocabulary words, and compile user-specific areas of interest.

Turning now to the figures generally, FIGS. 1 (1A, 1B) & 2 (2A, 2B) represent a robust, overarching system 20 and process 100, respectively, attendant to placing advertising sponsorship in a fabricated reading product. The system, broadly, notionally and advantageously, contemplates/implicates a user system 30, a network 60, and a reading product fabricator 70.

Characteristic of the user system is a user device 32, for example and without limitation, a personal computer, a lap top, a tablet, a smart phone, etc. characterized by an input/output device, storage 34, integral to the device or apart therefrom (e.g., remote, in the "cloud"), software 36, or hardware modules as the case may be, operable in relation to the device, or device and storage, for undertaking at least partial text evaluations, capturing reading metrics associated with user reading of a fabricated reading product (FIG. 13), with or without sponsorship, and/or management of user preferences and reading experiences. Word attributes of the words of sentences of the user select natural language text may be evaluated via the software, alternately, such word attribute evaluation or assessment may be undertaken part-and-parcel of the reading product fabricator. As will be subsequently set forth, a desemantified version of the user select natural language digital text, a post word attribution assessment wherein tags are substituted for the words of the sentences, is thereafter assessed. As should be readily appreciated, form fits function in relation to a system wherein a fabricated reading product is, at a minimum, produced, selectively adorned with sponsored content, and provided/offered to a digital reader.

Characteristic of reading product fabricator 70, contextually in the form of an app, software as a service (SAS) or hardware/hardware module(s), is a linguistic analyzer subsystem or element 72. In-as-much as word attribute assessment may be undertaken in connection thereto, as indicated and as is advantageous, sentence attribute assessment of the sentence(s) of the user select natural language digital text is undertaken via the fabricator, more particularly, in connection to an interrogation and enrichment frame element 74. More particularly, and advantageously, the sentence attribute assessment, e.g., a measure of sentence readability indicia/indices, is undertaken in connection to the desemantified text as indicated. Moreover, sponsored content analysis is undertaken in connection to subsystem or element 76, differentiated advertising sponsorship thereby indicated (i.e., include/omit), with placement within a display of the fabricated reading product further indicated. Finally, a credit/debit schema or exchange subsystem or module 78 may be optionally and advantageously provided, the schema or exchange characterized by one or more of, alone or in combination as circumstances warrant, ad-view and ad-click credit, user-sponsor ad-view trading, cross-platform ad-show exchange and pay-to-use features (see e.g., FIG. 12).

Figure 1A:
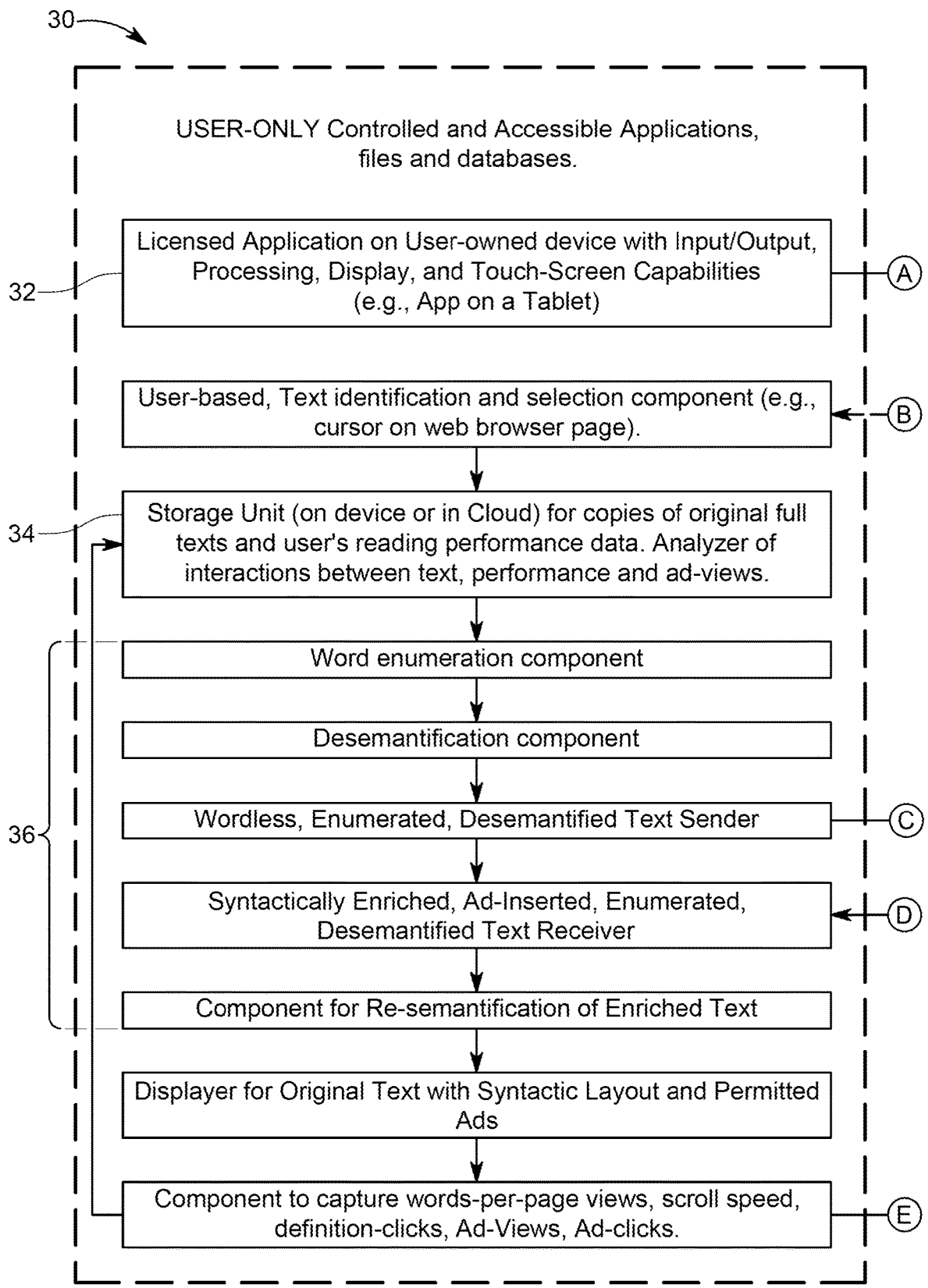
FIGS. 1A, 1B schematically illustrate a non-limiting differentiated advertising sponsorship system for contemplated reading assistance sponsorship in/for a fabricated reading product, component functionalities attendant to a comprehensive process of optimizing differentiated advertising sponsorship generally indicated.
Figure 1B:
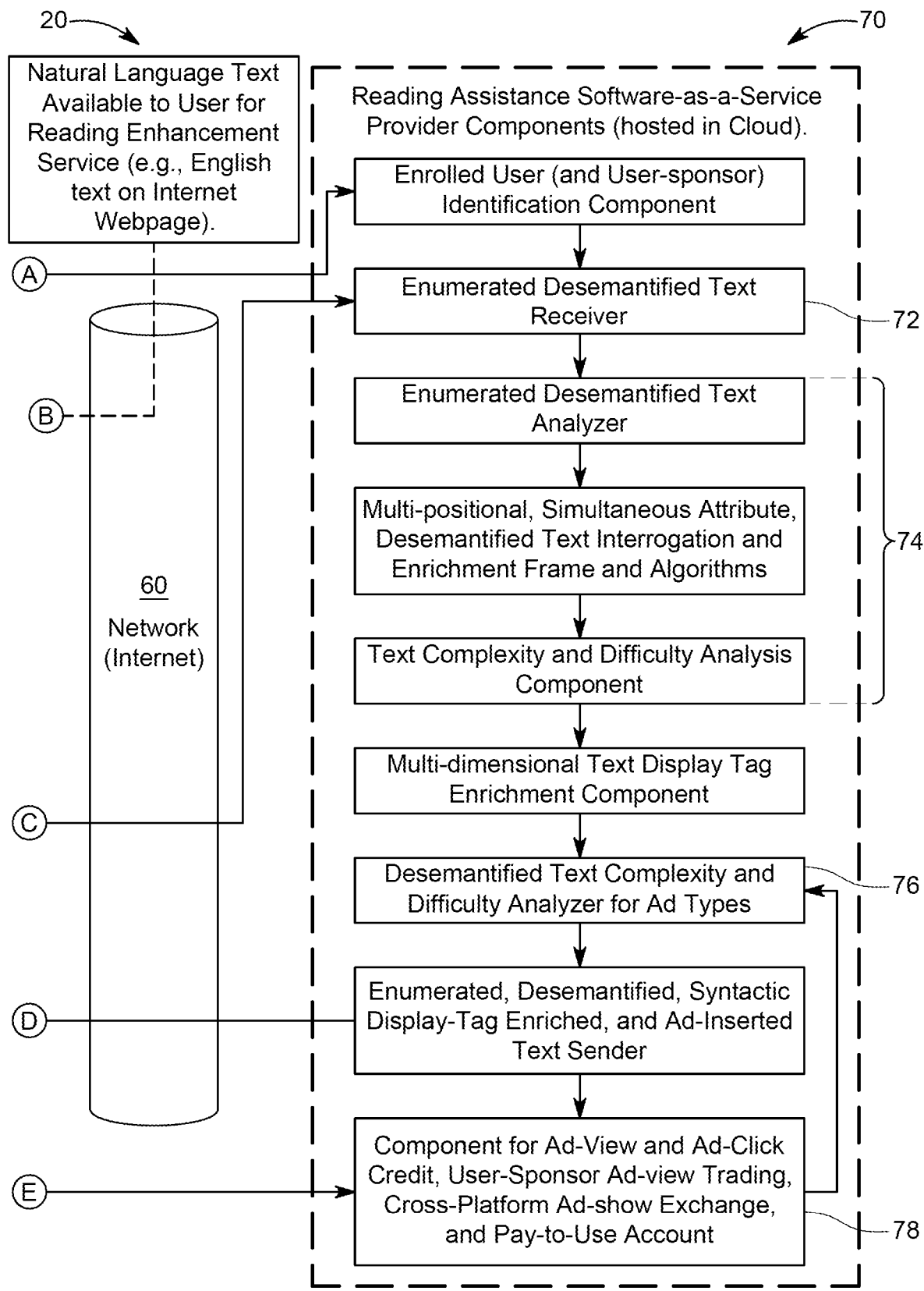

As has been at least essentially previewed in connection to an overview of the FIG. 1A, 1B system, characteristic of depicted process 100 is the identification of a user select natural language digital text 110, desemantification of the word attribute assessed user select natural language digital text 120, a sentence attribute assessment of the desemantified text 130, an optimization of differentiated advertising sponsorship 140, with regard to a display of the fabricated reading product, and delivery of the ad-optimized fabricated reading product 150. Further advantageous, non-limiting process steps or functions for the general process are shown/indicated FIG. 2 (2A, 2B), and described therein.

As should be appreciated from the description to this point, and with reference to FIG. 3 wherein particulars of/for desemantification 120 (FIGS. 2A, 2B) are provided, an advantageous, non-limiting technical feature of the contemplated process of optimizing differentiated advertising sponsorship is the removal of semantic meaning from the original text, while nonetheless retaining syntactic and text-difficulty information in a desemantified form of the text. Moreover, there also needs to be a process for separating the original text from the desemantified form of the text, while providing a unique key as a means to re-connect these two text versions after the desemantified form has been analyzed and enriched with multi-dimensional display-variation codes, the enriched desemantified version ultimately correlating to/with the fabricated reading product for display upon the user's device. The original text, and the key that will reconnect it with the enriched, desemantified version of the text, along with the software that performs these processes and maintains an internet-based communication with text enrichment software, are advantageously maintained in a secure and separate "location" that is exclusively available to the user.

The desemantified version of the original text, in turn, also requires systematic processing in relation to sentence attributes, via, for example, special multi-channel text-interrogation apparatus 74 (FIGS. 1A, 1B) in furtherance of performing the machine-executed enrichment processes, the apparatus/processes advantageously hosted on remote computers away, separate and apart from the user's device. Via such apparatus/processes, phrase boundaries and embedded structures will be identified and potential display properties denoted/delimited when the full original text is ultimately shown on a user's proprietary display module that assists human reading. The special multi-channel text interrogation apparatus is designed to simultaneously assess the desemantification codes of long strings of word-codes, and then execute operations on the strings, including combining, relabeling and demarcating increasingly nested segments of the string. The remote computers for adding display-enrichment codes to the desemantified text, will also store user-specific entries to the user's account, and analyze properties of the multiple enriched, desemantified versions of the user's texts to determine the types of advertising that may be used in association with any of the user's submitted texts.

Finally, the enriched, desemantified version of the text needs to be sent back to the user's secure account, where the text's unique key will be used to re-anneal the enriched desemantified text back with the actual words of the original text, as only these words are perceptible on the display module. Additionally, the display module, which can capture data on user-interaction with the displayed text such as, for example and with limitation, reading speed, preferred phrase-length, and definitions checked, and the data captured by the module, are advantageously maintained on the user's secure device. A user-controlled collaboration feature will advantageously permit sharing, selectively by the user, between the user's private archives of full texts and reading-performance data stored on the user's device with the external, display-code enrichment and ad-optimization system.

An advantageous, non-limiting illustration of the desemantification of user select natural language digital text is set forth hereinafter. The following original sentence from a US government CDC website is subject of the illustrated process:

Chronic infection can result in liver or urinary disease, while acute infection may produce rash and a serum sickness-like illness or may have unusual sequelae such as transverse myelitis and paralysis of the legs.

Preliminarily, a "Make_Word" step identifies words absent from a database associated with the contemplated system and assigns a provisional part-of-speech attribute to the word. The "-ion" ending and the "-ness" ending are used to conclude the words are singular nouns.

[Make_wordSL]
--->infection a00 Endings
--->illness a00 Endings

In "Make_Word" the original, user select natural language digital text is also reviewed and compared with a comprehensive database of hundreds of thousands of words and idioms (i.e., common multi-word terms) that includes the main and alternative parts of speech of each word. For example, the word "result" is encoded with a label "c46" which denotes a word that is an intransitive verb when used as a verb, but it is also given the label "[a00]" to denote that it could be a noun, depending on context. Moreover, the character-number position, (x), of the beginning of each word in the sentence is denoted by "rx", which follows the full word (semantic content) on the list. The actual length of the original word can be determined by subtracting its starting-character position in the sentence from the starting character position of the word following it, plus one for the space between the words. Note, the value "Pc," at position "¶~58" denotes the sentence character position of a comma.

Make Word Output
C ¶~0
*r97Chronic¶~2~¶
*a00infection¶~10~¶
*e40can¶~20~¶[a00]
*c46result¶~24~¶[a00]
*b75in¶~31~¶[q97b60]
*a00liver¶~34~¶
*b81or¶~40~¶

*r97urinary¶~43~¶
*a00disease¶~51~¶
Pc,¶~58~¶
*b10while¶~60~¶[b20q97b60]
*r97acute¶~66~¶
*a00infection¶~72~¶
*e40may¶~62~¶
*c45produce¶~66~¶[a00]
*a00rash¶~94~¶[r97]
*b81and¶~99~¶
*t97a¶~103~¶[b95t99y99z99]
*a00serum¶~105~¶[r97]
*r97sickness~like¶~111~¶
*a00illness¶~125~¶
*b81or¶~133~¶
*e40may¶~136~¶
*c41have¶~140~¶
*r97unusual¶~145~¶
*a00sequelae¶~153~¶
*b10suchpas¶~162~¶[r97]
*a00transverse¶~170~¶[r97s97]
*a00myelitis¶~161~¶
*b81and¶~190~¶
*a00paralysis¶~194~¶
*b75of¶~204~¶[p97b03]
*t97the¶~207~¶[b95y99z99]
*a001egs¶~211~¶

Thereafter, an "extended attribute" review is conducted to determine the grade-level difficulty of the word, and whether a noun is singular or plural. It is to be noted, that, at this point, the word being analyzed is only referred to by its unique sentence character-position number (FIG. 4). Note that the word denoted as "153," the word "sequelae" in the original user select natural language digital text sentence, is a grade level 17 word and has thusly been assigned that indicator, and it was found on a list of plural words that to do not end with the letter "s".

2(8)
10(7)
20(1)
24(5)
31(1)
34(9)
40(1)
43(10)
51(6)
58 Pc
60(3)
66(9)
72(7)
82(1)mpn(n)
86(6)
94(4)
99(1)
103(1)
105(15)
111(12)
125(8)plr(n)
133(1)
136(1)mpn(n)
140(1)
145(5)
153(17)plr(y)
162(3)plr(n)
170(14)
181(17)plr(n)
190(1)
194(10)plr(n)
204(1)
207(1)
211(1)plr(y)

A desemantified list is prepared by merging the grade-level and singular/plural extended attribute data of the "extended attribute" review with the part-of-speech data of the "Make_Word" step, using the sentence character-position number to indicate each discrete word entity (FIGS. 5 & 6). This character-position number will be used subsequently, after the display-code enriched and ad-optimized version is returned from the Readability Enhancement and Ad-Optimization service, to re-anneal the desemantified text with the original full-word version.

2(8)r97
20(1)e40 [a00]
24(5)e46 [a00}
31(1)b75 [q97b60]
34(9)a00
43(10)r97
51(6)a00
58 Pc
60(3)b10 [b20q97b60]
66(9)r97
72(7) a00
82(1)mpn(n)e40
86(6)c45 [a00]
94(4)a00 [r97]
99(1) b81
103(1)t97 [b95t99y99z99]
105(15)a00 [r97]
111(12)r97
125(8)plr(n)a00
133(1) b81
136(1)mpn(y)e40
140(1) c41
145(5) r97
153(17)plr(y)a00
162(3)plr(n)b10 r97
170(14)a00 [r97s97]
181(17)plr(n)a00
190(1)b81
194(10)plr(n)a00
204(1)b75 [p97b03]
207(1)t97 [b95y99z99]
211(1)plr(y)a00

Moreover, and optionally, partial desemantification, with user-control, may be performed by using grade-level difficulty, or word-length, to include the original word (semantic form) with the other codes on the list. For example, words with a grade-level of 10 or greater are allowed, by the user, on the following partial desemantified version of the illustrated user select natural language digital text sentence:

2(8)r97
10(7)a00
20(1)e40 [a00]
24(5)e46 [a00}
31(1)b75 [q97b60]
34(9)a00
43(10)r97 urinary¶~
51(6)a00
58 Pc
60(3)b10 [b20q97b60]
66(9)r97
72(7) a00
82(1)mpn(n)e40
86(6)c45 [a00]

94(4)a00 [r97]
99(1) b81
103(1)t97 [b95t99y99z99]
105(15)a00 [r97] serum¶~
111(12)r97 sickness~like¶~
125(8)plr(n)a00
133(1) b81
136(1)mpn(y)e40
140(1) c41
145(5) r97
153(17)plr(y)a00 sequelae¶~
162(3)plr(n)b10 r97
170(14)a00 [r97s97] transverse¶~
181(17)plr(n)a00 myelitis¶~
190(1)b81
194(10)plr(n)a00 paralysis¶~
204(1)b75 [p97b03]
207(1)t97 [b95y99z99]
211(1)plr(y)a00

Notionally, the partial desemantified sentence list above is analyzed for: (a) syntactic structures and other attributes that will direct the position of display-varying codes; and, (b) syntactic complexity, word-difficulty, and allowed semantic content to prepare a set of ads that will be positioned in association with the enhanced readability output (i.e., the fabricated reading product).

The analysis process for the desemantified user select natural language digital text sentence, namely, the desemantified list, commences with machine recognition of an entity of interest in the desemantified text string (DTS) using an apparatus of the contemplated system, namely, a multi-position, simultaneous attribute, test-string interrogation and enrichment frame (MP-SATIEF) of the reading product fabricator (FIGS. 1A, 1B). The DTS entity of interest is characterized by a particular attribute, an attribute called position "x". For each rule, relative to the entity at "x", the MP-SATIEF will then be directed to other entity positions that are proximal and distal to x within the DTS for the sentence: i.e., x+1, x−1, x+2, etc. (FIG. 14), and will look for the presence or absence of attributes at each position called for by the rules (see e.g., any of FIGS. 15-17) given to the MP-SATIEF. The MP-SATIEF has the capacity to extend its interrogation further proximal and distal to x, if conditions for the other positions are met, to ever more distal positions or proximal positions, such as x+n, to evaluate the attributes of n, as well as x+(n+1), etc. The MP-SATIEF may, as circumstances warrant, perform a "flash-forward" or "flash-back" inspection of the entire sentence proximal or distal to the entity at "x" to look for certain types of entities with particular attributes that can be used by the rule to make decisions for x or entities related to x. MP-SATIEF outputs are presented FIGS. 7&8.

The MP-SATIEF will simultaneously evaluate all of the attributes of each of the entities at all of the positions called for in a particular rule; if all of criteria are met, then the MP-SATIEF will add additional intra-process tags to the DTS that will be used in relation to the application of subsequent rules; if not all of the criteria are met, the MP-SATIEF will leave the DTS unchanged and proceed to another rule. The new, intra-process tags may be used to combine two or more adjacent entities into a combined, intra-process single-entity, which will then have the capacity to be interrogated by the MP-SATIEF with other rules. The MP-SATIEF may also add intra-process tags that can prevent adjacent entities from being combined in future rules, or enable entities to become logically "invisible" so that the MP-SATIEF interrogation of entities across positions x, x+1, and x+n, can directly inspect attributes at x and x+n, while ignoring the entity at x+1, if the attribute for x+1 qualifies.

The sets of rules that are used by the MP-SATIEF can be used repeatedly, in a recursive process. Different sets will perform particular kinds of syntactic analyses, based on the attributes of the entities in the DTS. For example, the DTS entities at 60(3)b10 [b20q97b60]
66 (9)r97
72(7) a00
82(1)mpn(n)e40 can be analyzed simultaneously by the MP-SATIEF using the entity at position 66 for x, position 72 for x+1, 82 for x+2 and 60 for x−1. A rule will use the attribute of each entity to determine that: 66 is an adjective; 72 is a singular noun; 60 is a non-determiner that would not participate in the formation of a noun-phrase; and, 82 is a definitive modal verb which would not be a candidate for participation in the formation of a noun-phrase. Combined, all of these attributes, interrogated simultaneously by the MP-SATIEF, enable the MP-SATIEF to execute the instructions of the rule to merge 66 and 72 into a single entity NP66~72 that will participate in future interrogations as a singular noun phrase, which starts at position 66. The MP-SATIEF will also allow all of the prior tags of the internal elements of the new noun phrase to remain in the DTS, in case other rules need to "look inside" the noun phrase for information of interest. The non-syntactic tags, such as Grade-Level difficultly, can also remain with the entity.

Another example of multi-positional simultaneous text-string interrogation and enrichment of the DTS is illustrated in the following sequence, where a rule for "induction" is used:

103(1)t97 [b95t99y99z99]
105(15)a00 [r97]
111(12)r97
125(8)plr(n)a00
133(1) b81

In this case, the initial entity of interest is 105 as x, 103 as x−1, 111 as x+1, 125 as x+n, where n=2, and 133 as x+n+1 or x+3. The logic in the MP-SATIEF apparatus will simultaneously determine: (a) that 103, at x−1, is a determiner that can exert its effects on nouns through adjectives that might lie between the determiner and a definitive noun (but not if the noun could also be a third-person plural form of a verb); (b) that x is a word that could be either a noun or an adjective, (c) while x+1 is a word that can only be an adjective; (d) that x+2 is a word that can only be a singular noun; and, (e) that x+3 is a word that cannot participate in a noun-phrase. Combined, these entity attributes, interrogated simultaneously, enable the MP-SATIEF to conclude that x, which could have been either a noun or an adjective, must be an adjective in the noun phrase, along with the adjective at x+1, both modifying the noun at x+2; additionally, the determination at x−1 is combined with the other words, to create the singular noun phrase NP103~105~111~125~133. This is how the word that could have been either an adjective or a noun, 105, is "induced" to play the role of an adjective, because of the attributes of the adjacent elements in the DTS. This illustrates the ability of the reading product fabricator to use DTSs to perform syntactic structure extraction that will then be used to add Display-Variation tags (FIGS. 9 & 10) that will be used on the user's device display/display platform after the enriched DTS, with optimized differentiated ads, is returned to the user.

Turning now to the rule based/driven syntactic structure analysis of the DTS of the desemantified list via MP-SATIEF, and as was earlier touched upon, a non-limiting header row representing a rule structure for to-be-applied rules is generally set forth FIG. 14. Each row beneath the header contains a rule, (Step), for a particular combination of attributes from entities ranging from x−1 through (x+n)+1, and an instruction for which words to combine into a "cluster" and what the new "cluster" should be labeled as. The apparatus also includes instructions on which step to go to next, if a combination is made, as well as instructions on which step to go to next is no operation is done.

Sets of rules used by the MP-SATIEF can be repeated as long as candidates for interrogation are still in the DTS; for example, sets of rules for combining an adjective with an adjacent noun, or for combining an adverb with an adjacent verb. Then, the MP-SATIEF can proceed to other sets. However, the derivative products, i.e., the newly identified, intra-process combined entities with their new tags, may qualify for re-examination by an earlier set. In other words, the recursion of interrogation of the DTS by the MP-SATIEF can be within a rule set and between and among multiple rule sets. With repeated cycles of interrogation of the DTS, the MP-SATIEF will add higher order syntactic structure tags that denote compound verb phrases, compound noun phrases, and clauses, including clauses that may be embedded within other phrases. Illustrations of multiple sets of rules among and between which recursive interrogation of the DTS by the MP-SATIEF takes place, namely, and in reference to each of FIGS. 15, 16 & 17, with regard to adjective pre-cluster rules, noun phrase tie clustering rules, and non-adjacent term/word assessment rules. Finally, the MP-SATIEF also compares the product of one cycle of interrogation across all sets with the product of interrogation of the past prior cycle; if the MP-SATIEF recognizes that the products of cycle c−1 and cycle c are identical, it will determine that all efforts for DTS enrichment of the sentence have been exhausted, and it will conclude its interrogation.

Once the syntactic structure extraction steps by the MP-SATIEF have been completed, there are hierarchical tags for phrase and clause structures, from outermost to innermost, as follows:

<C1>
<NP>#2 #10</NP>
<VP>18>#20 #2414>
<PP>#31 #34 #40 #43 #51 #58</PP
></VP>
</C1>
<C2>
<NP>#60 #66 #72</NP>
<VP1>#82 #86
<NP1>#94</NP1>
<NP2>#99 #103 #105 #111 #125</NP2>
</V P>
<VP2>#133 #136 #140
<NP1>#145 #153
<PP>#162<NP1>#170 #181
</N P1>
<NP2>#190 #194
<PP>204 #207 #211</PP>
<IN P2>
</VP2>
</C2>.

These sentence structure tags are then used to identify positions for display-variation tags in furtherance of producing/displaying the fabricated reading product. These tags denote potential positions where the displayed text will be split onto a new line, and the relative indentation of the new line compared to other line-indentations for the phrases in the sentence (i.e., cascading text segments). The display-variation tags can also denote true-verb high-lighting, which the display/display module can enable based on the user's choice. In the tags shown, the lower case "1" at the beginning of a line is followed by a number denoting how far to the right the indentation of that row would be; the |8> to |4> brackets denote highlighting effects for true verbs.

105 #2 #10
107|8>#20 #24|4>
112 #31 #34 #40 #43 #51 #58
107 #60 #66 #72
109|8>#82 #86|4>
112 #94
113 #99 #103 #105 #111 #125
109 #133 |8>#136 #140|4>
113 #145 #153
117 #162 #170 #181
120 #190 #194
117 #204 #207 #211.

Figures 11A, 11B:
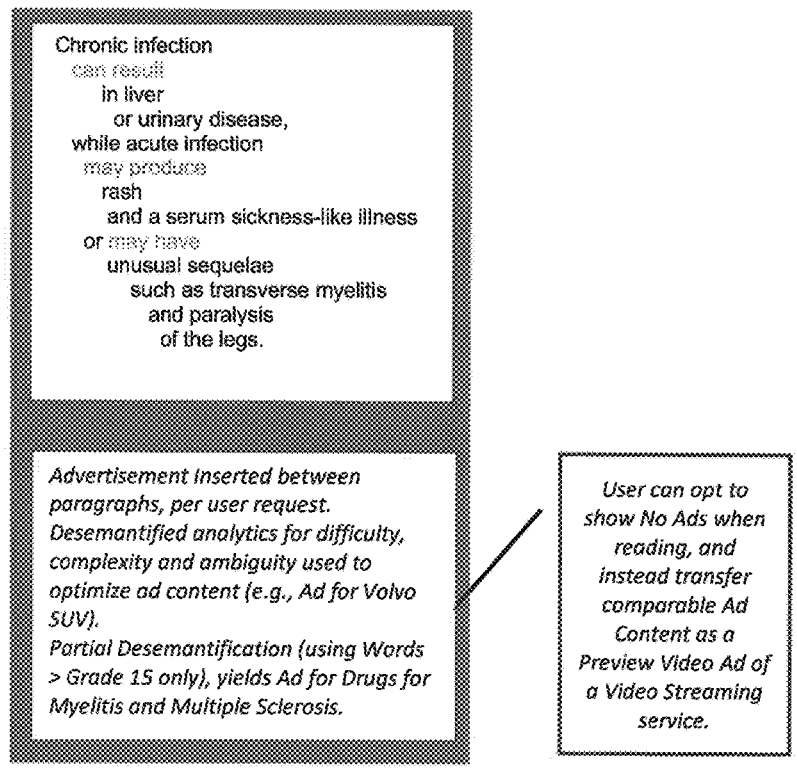
FIGS. 11(A) & 11(B) represent output of the readability service/device, namely, a fabricated reading product, and a sponsored version of same, respectively.
Figure 12:
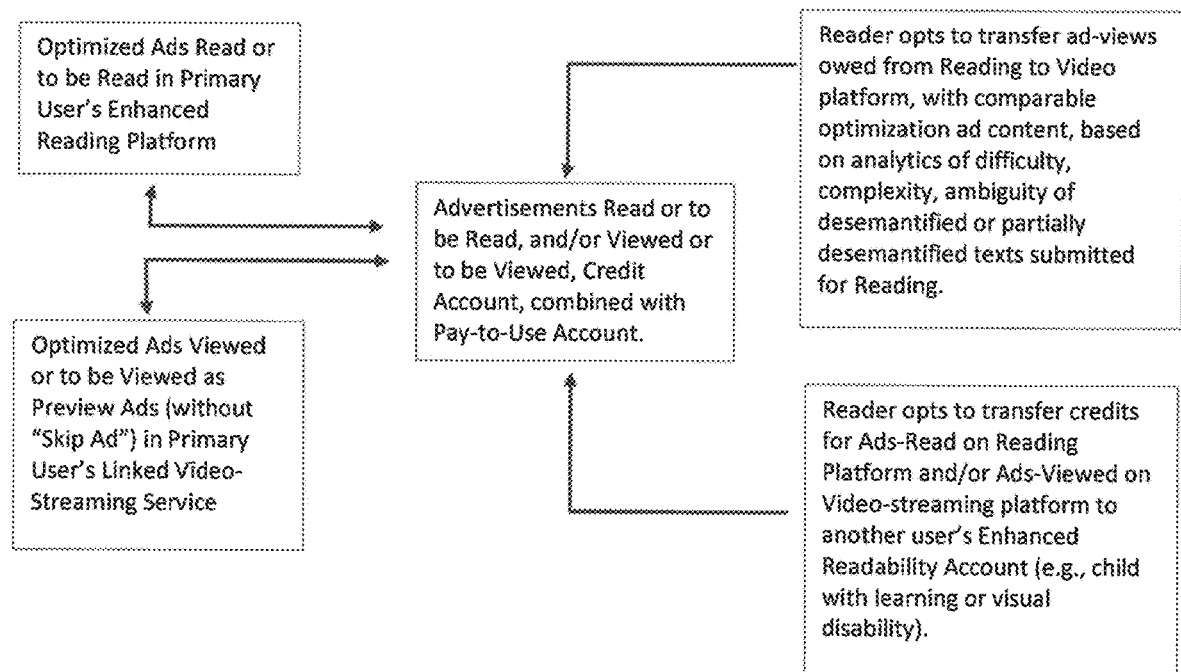

Based on the syntactic structure, including, e.g., the number of embedded clauses and phrases, the length of the sentence, and/or the difficulty level of the words, the submitted text is analyzed by algorithms that can help provide a more effective and valuable ad, in the position specified by the user (e.g., between paragraphs (FIG. 11(B)). In this case, the allowed words in the partial desemantified text string (e.g., grade 10 level or higher), enable the advertising algorithm to determine that the sentence pertains to medical conditions. The syntactic complexity and word difficulty also enable the advertising algorithm to determine that the sentence is written at a grade 18 level, making the user likely a medical professional. Ads with medical content will thus be added according to these analyses—between paragraphs as permitted by the user.

After the DTS with Display-Varying tags Ads is returned to the user's device, the original text key, using the character-position number as the marker for each word, is used to replace all of the words in the Enriched DTS. This new file thus appears to the Display module in this form.

105Chronic infection
107|8>can result|4>
112in liver or urinary disease,
107while acute infection
109|8>may produce|4>
112rash
113and a serum sickness-like illness
109or |8>may have|4>
113unusual sequelae such
117as transverse myelitis
120and paralysis
117of the legs.

As noted previously, In the tags shown, the lower case "1" at the beginning of a line is followed by a number denoting how far to the right the indentation of that row would be; the |8> to |4>brackets denote highlighting effects for true verbs. The display module uses these tags to present the final text layout (FIG. 11(A)), with verbs high-lighted.

Chronic infection
     can result
       in liver
         or urinary disease,
      while acute infection
        may prod uce
          rash
            and a serum sickness-like illness or may have
  unusual sequelae
    such as transverse myelitis
    and paralysis
    of the legs.

If the display module only shows this one sentence on the screen, then a calculated reading speed would divide the 34 words in this sentence by the time in minutes to read it. The time on this screen before proceeding to the next screen would provide the time (e.g., 10 seconds, which amounts to 204 words per minute). Given the Grade-level difficulty of the sentence (grade 18), the software can track the difficulty-adjusted reading speed of the user when reading sentences across varying levels of difficulty.

Another function of the display module is to engage the display-variation tags to varying degrees. In this illustration, the user chooses to only engage the shorter indentation tags, (e.g. lxx is less than 110), which results in longer line lengths in the displayed text.

Chronic infection
  can result in liver or urinary disease,
    while acute infection
      may produce rash and a serum sickness-like illness
      or may have unusual sequelae
        such as transverse myelitis and paralysis of the legs.

The choices made by the user, for example, whether to use shorter phrases or longer ones in the display module, combined with the difficulty-adjusted reading speed, can be analyzed in the user's all text archive to help the user identify those parameters that give the best possible reading performance.

Having set forth particulars in connection to a sample user text, some concluding observations are warranted. More particularly, a summary of steps for desemantification for attribute extraction and multidimensional display with ad insertion hereinafter follows.

Initially, words of a character string sequence (e.g., a sentence) corresponding to a user select natural language text are numbered, and the character per word are numbered and noted. For each word, a word attribute, for example, a difficulty indicia characterized by, for instance and without limitation, grade level, syllables and ambiguity is assigned. A database look-up thereafter follows for multiple possible part-of-speech (POS) tagging/tag placement.

Original words from the sentence are removed, from the sentence numbered word list, in a desemantification step, with context-specific multi-word term testing for multi-word term tag removal conducted. A multi-positional, simultaneous-attribute, and recursive interrogation with nested tag enrichment step thereafter proceeds in systematic fashion in connection to a variety of categories. For instance, Category I, immediate context, direct-phrase induction with enrichment using inter-word ties directed to, for example: (a) simple adjective phrase contextual induction (b) simple noun phrase contextual induction (c) simple adverb phrase contextual induction (d) simple verb phrase contextual disambiguation and conjugation (e) simple preposition phrase contextual induction; Category II, deferential, contingent gathering of distal phrase contents with enrichment using phrase-cluster tags, directed to, for example: (f) complex noun-phrase deferential and contingent gathering (g) complex verb-phrase deferential and contingent gathering (h) compound pairs with a subject-less verb-phrase deferential and contingent gathering; Category III, deferential and contingent enveloping of phrases and clauses, with enrichment using open, closed, and touched-mate-but-waiting-for-mate-to-close tags for subject-predicate agreement-signaling from distal to proximal end of noun-phrase, directed to, for example: (i) case-agreement confirmed clause encapsulation (j) clause-phrase enveloping with deferred closure (k) tail-to-head signaling of noun-verb encounter with case agreement; and, Category IV, directed to (l) recursive interrogation through steps (f) through (k) with nested enveloping of noun-phrases, verb-phrases, and encapsulated clauses, using enrichment with envelope tags.

An analysis of sentence difficulty is next undertaken, based on the earlier individual word attribute assessment (i.e., difficulty indicia vetting), and sentence structure complexity analysis via the multi-positional, simultaneous-attribute, and recursive interrogation with nested tag enrichment. Advertising analytics are next applied to the desemantified sentence characterized by word difficulty and sentence structure complexity, with a conversion of nested structure extraction tags to multidimensional display tags completed thereafter. At this point, output is returned to a user's privacy-protected text space, and re-semantification of the sentence completed wherein placing original words with multidimensional display tags.

The analyzed sentence, in the form of a fabricated reading product, is presented/displayed via the multidimensional formatting platform, with an addition of ads to displayed text with ad type and position chosen based on analysis of desemantified text-only via the earlier application of advertising analytics thereto. Finally, user reading performance of their reading with multidimensional enhanced text display may be monitored or monitored/recorded, with a transfer of ad-view credits to another user's account.

In light of the foregoing, a variety of non-limiting exemplary embodiments and/or permutations of contemplated systems, services, apparatus, methods, and/or processes relating to providing advertising sponsorship in the context of a fabricated reading product intended for cognitively enhanced reading, not inconsistent with the instant disclosure, are to be noted and hereinafter sequentially set forth.

A machine-executable system for improving the effectiveness of sponsorship advertising for readability enhancement services and products, in which the readability enhancement product uses linguistic analysis of user submitted texts to modify the display of the text, the system: (a) stores the user submitted text, (b) extracts text specific features from the stored text, and (c) applies the extracted text features and user data to algorithms that differentiate the advertisements presented to the user of the submitted text.

A machine-executable system for protecting the privacy of users of an enhanced readability service, while still using user-permitted data to optimize advertising sponsorship, that (a) stores the user-submitted text in a protected compartment, (b) desemantifies the text by substituting words with non-linguistic codes that denote a word's part-of-speech, polysemy, rarity and grade-level difficulty, (c) analyzes the desemantified text for overall text difficulty, clarity, and syntactic complexity and other non-semantic, text-specific properties, and (d) uses the results of this analysis to both (i) vary the physical-perceptual display of the text for improved human readability, and (ii) assess and vary the types and properties of advertisements to be displayed in conjunction with the text.

A machine-executable system for users of readability services or other online media delivered with sponsored advertising that accrues and stores instances of advertisements-viewed as credits that can be redirected to permit use of the readability service without advertising with other texts, and/or by other users.

A machine-executable system for users of readability services or other online media delivered with sponsored advertising that accrues and stores instances of advertisements-viewed as credits that can be combined with a pay-to-read account.

A machine-executable system for users of enhanced readability services that optimizes the varied presentation of sponsored advertising associated with the enhanced text by: (a) capturing and storing: (i) the user's interaction with the text, (including reading speed and document completion, time and day when read, location and device-type used), and (ii) the text-specific attributes of the text, (including difficulty, complexity, clarity and other non-semantic attributes), and (iii) the various types and patterns of advertisement placement that occur with each text; and then (b) analyzing the variation in the specific user's reading performance (such as difficulty-adjusted reading speed) as a function of the type and placement of the sponsored advertising; and then (c) using the results of the analysis to vary future types and placements of advertising sponsorship of the readability service in a manner that permits optimal reading performance at the most cost-effective advertisement method.

A machine-executable readability enhancement system that analyzes, across an individual user's multiple, stored, user-submitted texts, the user's reading performance data, text-specific non-semantic difficulty data and advertising-impact-on-reading-performance data, to modify the text presentation variables used in displaying the enhanced text comprised of phrase segmentation, verb highlighting, color, and/or font, in order to reduce the negative impact of advertising on the user's reading performance.

A machine-executable readability enhancement system that analyzes, across multiple, stored, user-submitted texts: (a) the user's prior reading performance data, (b) text-specific non-semantic difficulty data, and (c) advertising-impact-on-reading-performance data, to identify, at each future, user-specific, text-specific and circumstance-of-use specific instance of an enhanced text delivery, those instances when no advertisements should be used, using instead a user's prior advertisements-viewed credits or pay-to-read account, or those of a parent or other reading benefactor, to cover the cost of the readability service for that instance.

A machine-executable readability enhancement system that analyzes changes in reader performance over time, while protecting reader privacy, by: (a) storing in desemantified form all texts submitted by an individual user, (b) storing user-interaction data to include difficulty-adjusted reading speed and difficulty-adjusted document completion, (c) storing advertising-impact-on-reading-performance data, (d) determining, over time and over the cumulative number of texts read with the service, the individual reader's performance, with adjustments for text difficulty, reading circumstance, and advertisements used, to assess gains or losses in such adjusted-performance measures over time.

A machine-executable user privacy-protection system that: (a) permits a user to store, in a separate, user-only accessible compartment, all texts in their full original form that the reader had selected for eventual submission to an enhanced readability service, then (b) performs a desemantification process on the stored texts, and (c) links the desemantified version to the original version of the text with a unique code only accessible to the user, in order to enable the user to retrieve particular texts in their full and original form, and which the readability enhancement service had previously processed in desemantified form, as having certain properties that are of interest to the user, properties comprised by one or more of difficulty, place and time when read, device used, reading speed, completion percentage, associated advertising.

A machine-executable readability enhancement system that combines (a) desemantification of user-submitted text, (b) text-specific analytics to modify the display of the text for improved readability, (c) a display platform that captures the reader's text-specific reading performance data, (d) optimization of type and placement of sponsoring advertising, (e) cumulative storage and analytics of all prior submitted texts in desemantified form, and (f) means for the user to have user-controlled access to the original text while also linking the specific original text to the results of analytics and specific associated advertising of the desemantified displayed text, that provides a means for the user to (i) confidentially review the effects of various advertising on the reader's prior reading performance with access to the full original text and the associated advertising that the readability service had shown with the enhanced readability version of the text, and then (ii) specify categories of advertising that the enhanced readability service shall or shall not be permitted to use with future uses of the readability enhancement service.

A machine-executable method and apparatus that enriches desemantified text-strings with display-variation codes based on syntactic structure extraction from the desemantified text-string that performs: (a) placement of the desemantified text-string into a multi-positional, simultaneous attribute interrogation and enrichment frame; (b) application of sets of rules that specify attributes for each of the elements at multiple positions proximal and distal to a targeted element in the text-string that are required to perform a particular operation on the text string relative to the targeted element; (c) application of rule-based operations to be performed that enrich the text-string with intra-processing tags that create new elements by clustering two or more initial elements and labeling the cluster with new attributes; (d) instructions for proceeding from rule to rule, with recursion through the rule sets until all potential clustering is completed; (e) rules for concluding an interrogation based on lack of change in state of the text string on cycle to cycle inspection; (f) substitution of intra-processing enrichment tags with display-variation tags that specify row number, indentation value, relative font size, font style, and font color of discrete segments of the desemantified text string.

A machine-executable method, apparatus and system for readability enhancement services that combine linguistic analysis with varied display of the user's submitted text, while protecting the user's privacy and optimizing the value and acceptability of sponsorship advertising, by: (a) desemantifying the user's initial natural language text on a user-controlled device; (b) sending the desemantified text-string to a remote server where linguistic analysis is performed on the desemantified text-string by the readability enhancement service; (c) enriching the desemantified text-string with display-variation tags based on the linguistic analysis; (d) adding to the enriched, desemantified text-string user-optimized ads, based on user-specified criteria and analysis of the desemantified text-string for syntactic complexity and grade-level difficult; (e) returning to the user's device the ad-optimized, display-variation tag-enriched desemantified text-string; (f) replacing the desemantified codes of the desemantified text string with the position-marked initial words of the originally submitted full text; (g) displaying the enhanced text with improved readability by engaging one or more of the display-variation enrichment tags with a display module that operates on the enrichment tags to varying degrees based on user choice; (h) placing system-identified ads in association with the displayed text.

A method and apparatus that recursively identifies initial and derived attributes from natural language text strings and then enriches the natural language text strings with derived attribute tags, using: (a) an initial text-string enrichment step that assigns attributes to each element (word, phrase, or punctuation mark) in the text string; (b) a multi-positional, simultaneous attribute-interrogation frame, (MSATIF); (c) a set of instructions for the MSATIF that first targets a particular text string element, based on that element's initial or derived attribute, and then simultaneously interrogates multiple other elements proximal to or distal to the targeted element; (d) a set of rules for text-string enrichment that inserts, based on the interrogation results from the MSATIF, additional text-enrichment tags into the text string.

Finally, what has been described and depicted herein are preferred, non-limiting embodiments of Applicant's subject matter. Since contemplated system and/or service disclosed herein may be embodied in other specific forms without departing from the spirit or general characteristics thereof, some of which forms have been indicated, the embodiments described and depicted herein/with are to be considered in all respects illustrative and not restrictive. Moreover, while robust processing has be described and detailed, advantageous processes are not so limited, select step subsets believed desirable and advantageous. Accordingly, the scope of the subject invention is as defined in the language of the appended claims, and includes not insubstantial equivalents thereto.

What is claimed is:

1. In a process of differentiated advertising sponsorship of digital content utilizing a system having a user domain interactively linked to a reading product fabricator for fabricating a reading product characterized by cascading text segments and selective inclusion of an advertisement, and a text display platform for displaying the fabricated reading product, steps comprising:
   a. storing user select natural language digital text in respect of the user domain of the system for exclusive access by the user, the user select natural language digital text characterized by sentences, each sentence of the sentences characterized by words;
   b. assigning, in respect of the user domain, a character number position to a beginning of a word of each of the words of the sentence;
   c. evaluating, in a functional unit of the user domain, the words of a sentence of the sentences of the stored user select natural language digital text with regard to word attributes for the words of the sentence of the sentences of the user select natural language digital text;
   d. desemantifying, in a second functional unit of the user domain, stored user select natural language digital text whereby words of the sentence of the stored user select natural language digital text are systematically replaced with tags that correlate to a word attribute of word attributes for the words of the sentence of the stored user select natural language digital text so as to delimit a proxy text to be evaluated by one or more functional units of the reading product fabricator, the proxy text characterized by the assigned character number position of the beginning of the word of the words of a sentence of the sentences of the stored user select natural language text;
   e. evaluating the proxy text, via one or more functional units of the reading product fabricator, with regard to sentence readability and syntactic structure extraction of a proxy test string so as to delimit an enriched proxy text string;
   f. determining whether to supply an advertisement from an advertising sponsor in relation to a text display platform display of the fabricated reading product, and, in connection to supplying an advertisement from an advertising sponsor in relation to the text display platform display of the fabricated reading product, further determining placement position of the advertisement in relation to the text display platform display of the fabricated reading product;
   g. resemantifying enriched proxy text strings from the reading product fabricator, in a further functional unit of the user domain, in furtherance of the text display platform display of the fabricated reading product characterized by cascading text segments and the selective inclusion of an advertisement; and,
   h. selectively clicking the text platform display of the fabricated reading product so as to either express an interest in an included advertisement, define a word of words of the cascading text segments, determine displayed word count, or determine estimated reading speed for the displayed fabricated reading product.

2. The process of claim 1 wherein the word attributes comprise one or more of word difficulty, part-of-speech and/or multiple possible parts of speech.

3. The process of claim 1 wherein the word attributes comprise one or more of word difficulty, part-of-speech and/or multiple possible parts of speech, word difficulty characterized by word length, syllable number, and/or grade level.

4. The process of claim 1 wherein the measure of sentence readability indicia is characterized by one or more of sentence difficulty, sentence ambiguity, and/or sentence complexity.

5. The process of claim 1 wherein the measure of sentence readability indicia is characterized by one or more of sentence difficulty, sentence ambiguity, and/or sentence complexity, sentence difficulty characterized by word count number.

6. The process of claim 1 wherein the measure of sentence readability indicia is characterized by one or more of sentence difficulty, sentence ambiguity, and/or sentence complexity, ambiguity characterized by multi-word terms.

7. The process of claim 1 wherein the measure of sentence readability indicia is characterized by one or more of sentence difficulty, sentence ambiguity, and/or sentence complexity, complexity characterized by a presence of one or more of independent clauses, compound verb phrases, and/or compound noun phrases.

8. The process of claim 1 further comprising accessing user specific variables and/or metrics designated in respect of the user domain, the advertisement supply/placement determining is further based upon one or more accessed user specific variables and/or metrics.

* * * * *